Nov. 8, 1927.
L. SCHWARZMANN
1,648,007
GOLD LETTERING MACHINE
Filed Dec. 4, 1923 15 Sheets-Sheet 8
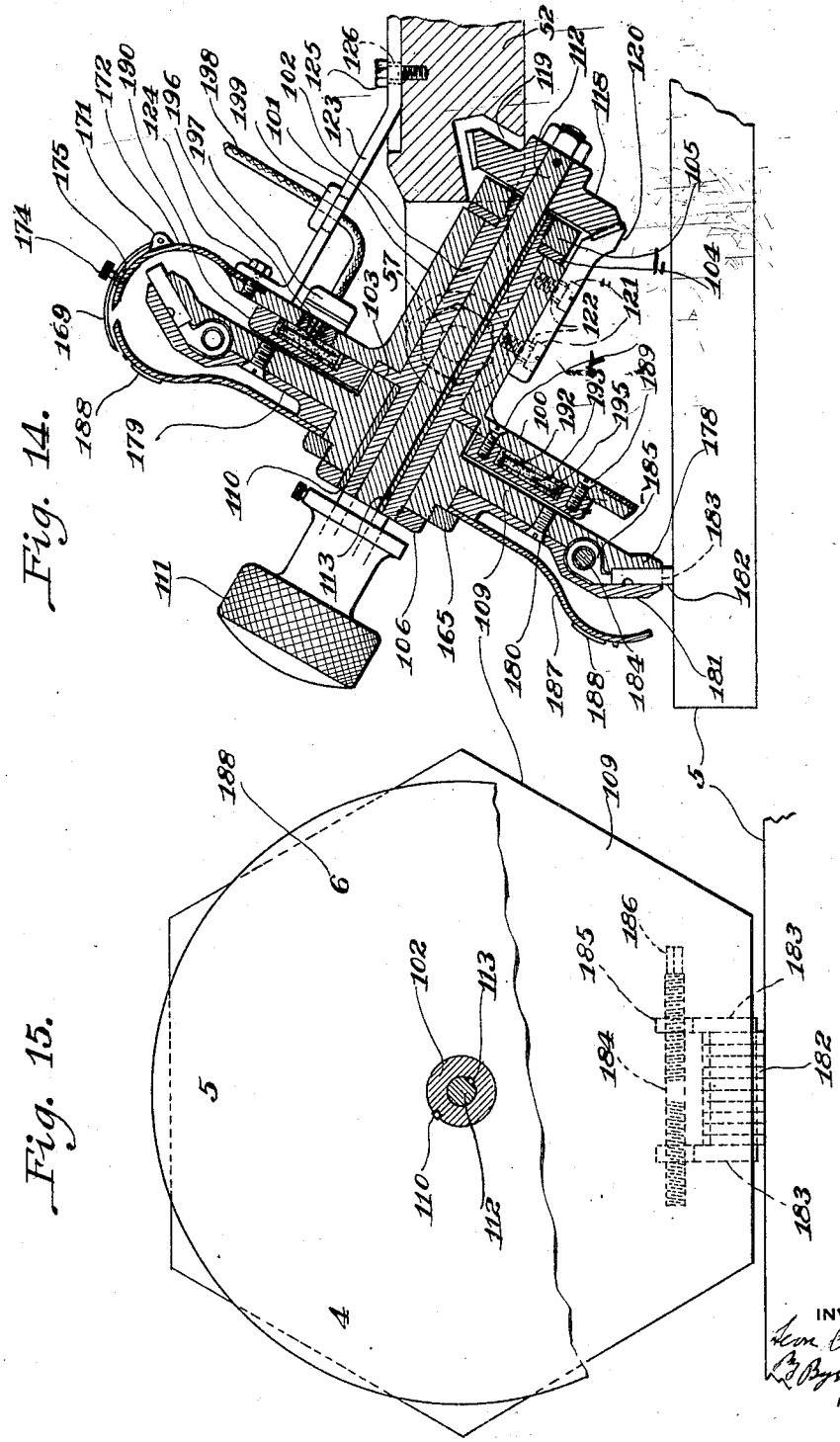

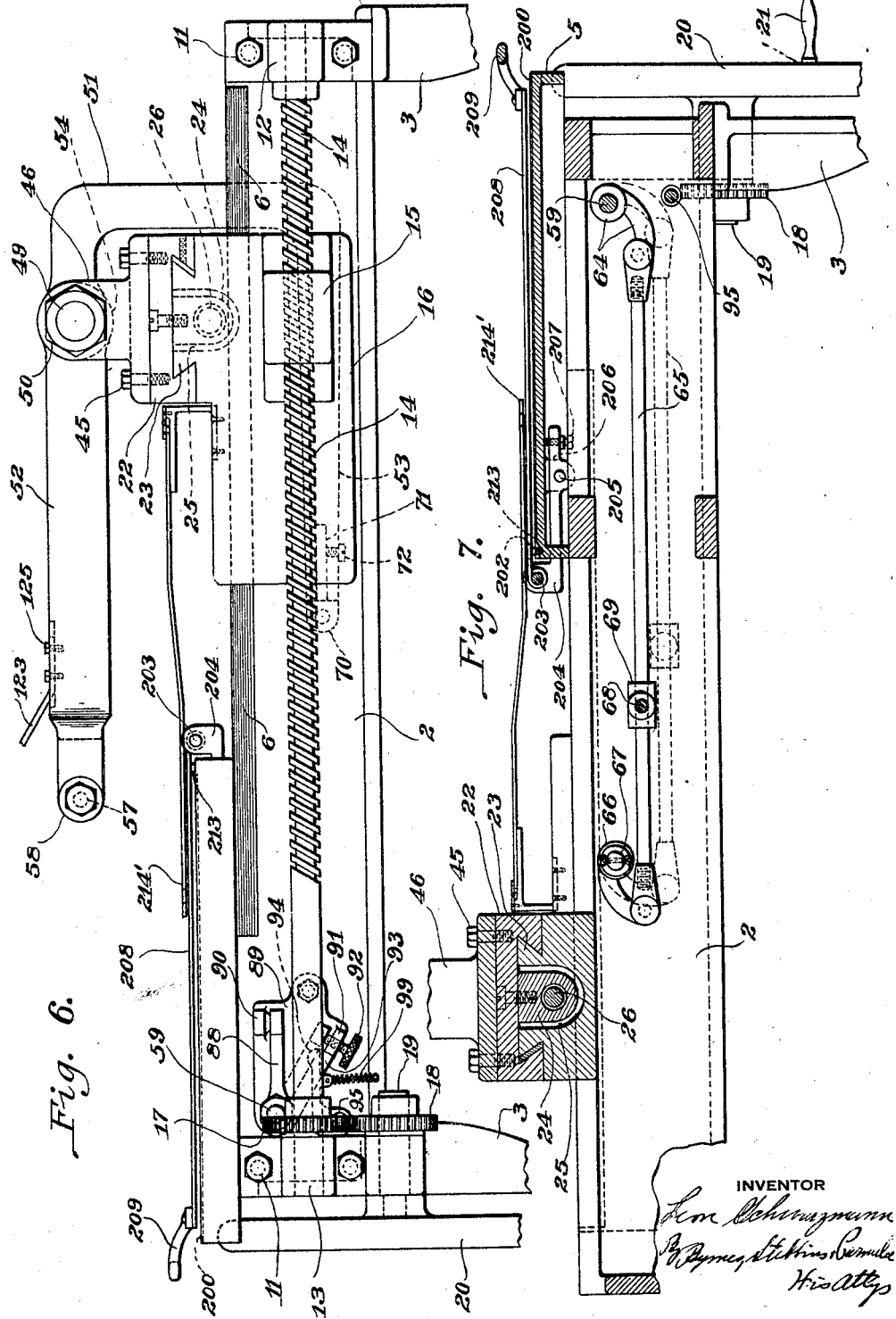

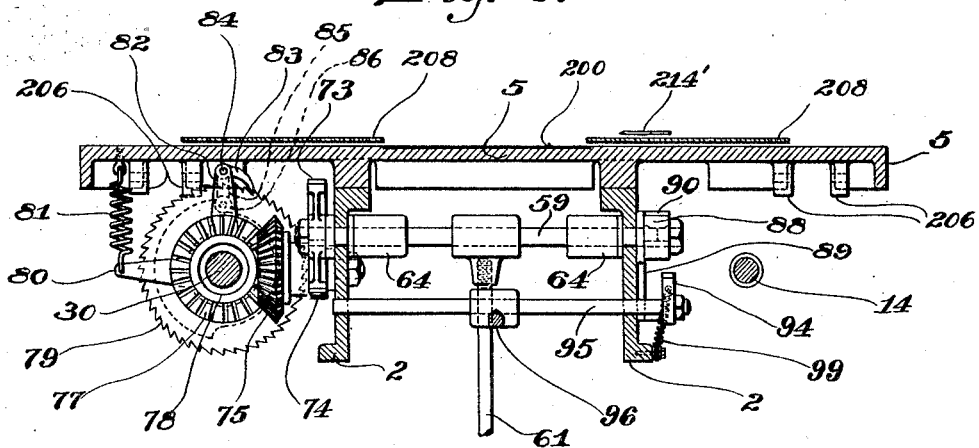
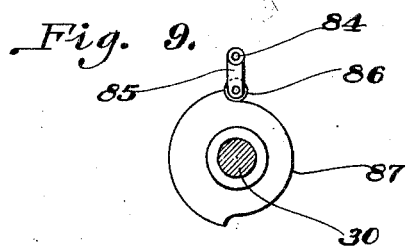
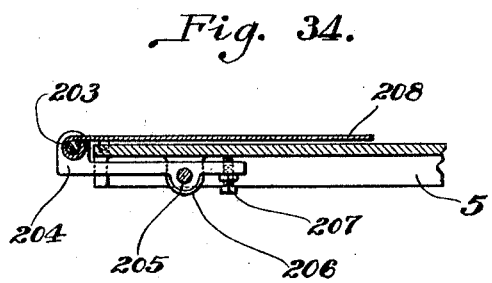
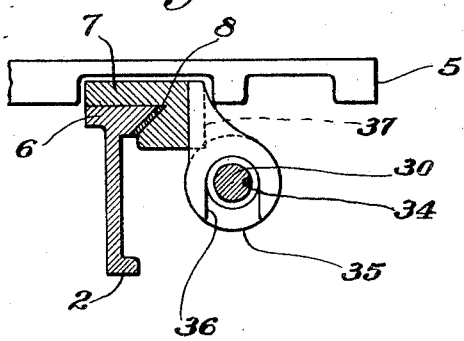
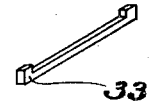

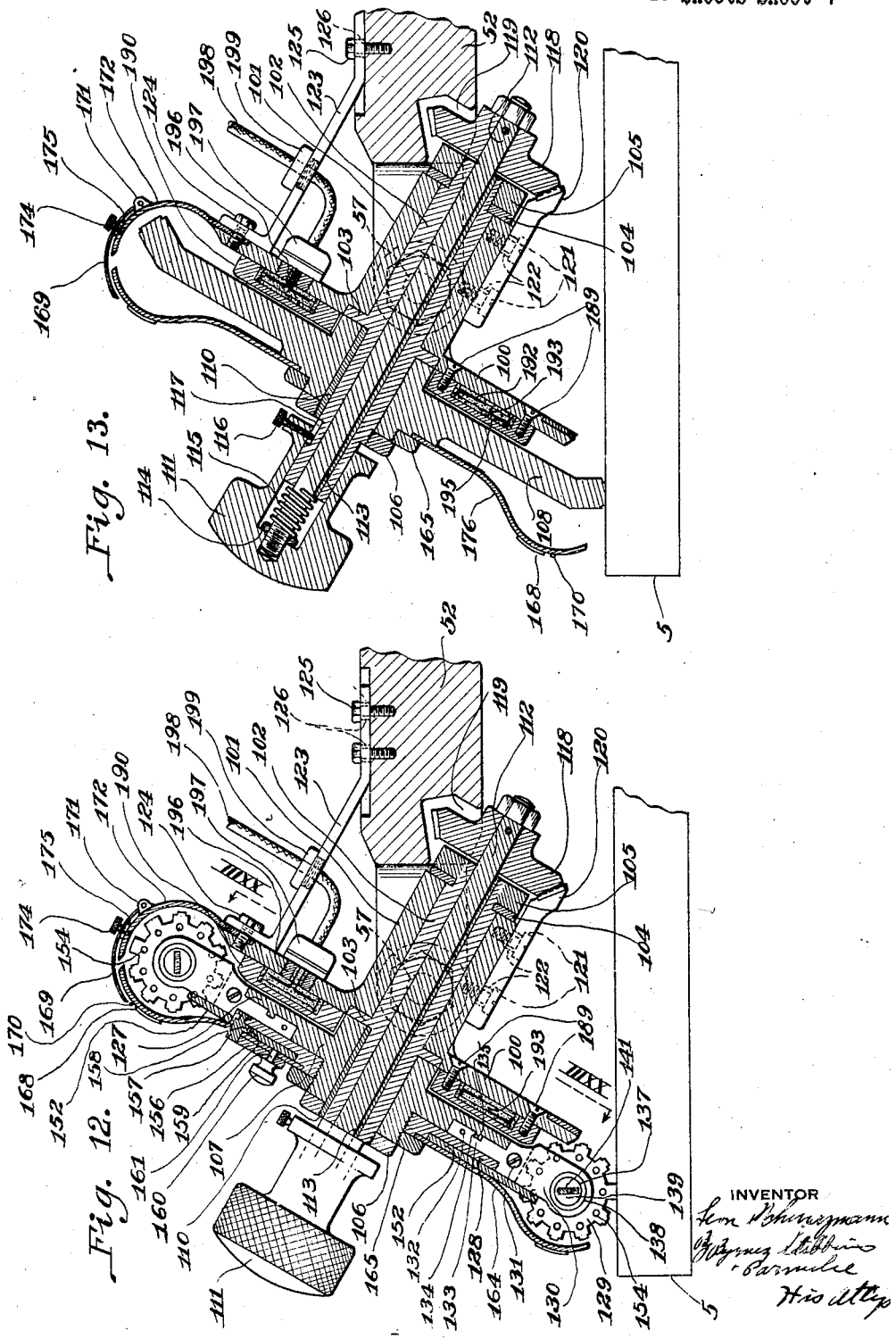

Nov. 8, 1927. 1,648,007
L. SCHWARZMANN
GOLD LETTERING MACHINE
Filed Dec. 4, 1923 15 Sheets-Sheet 9
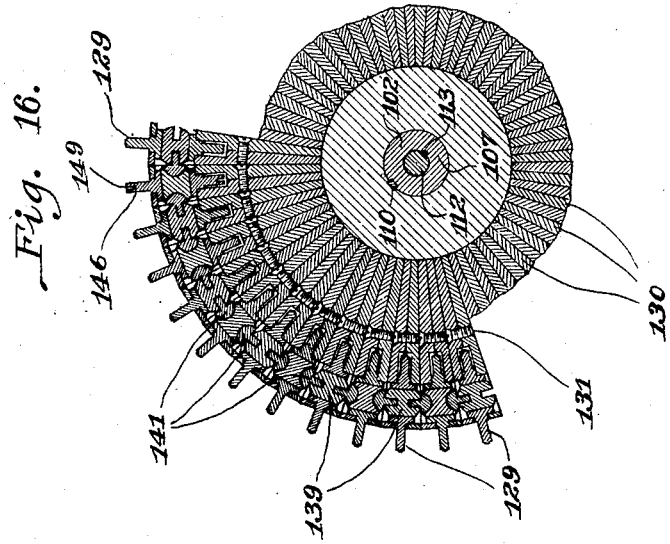
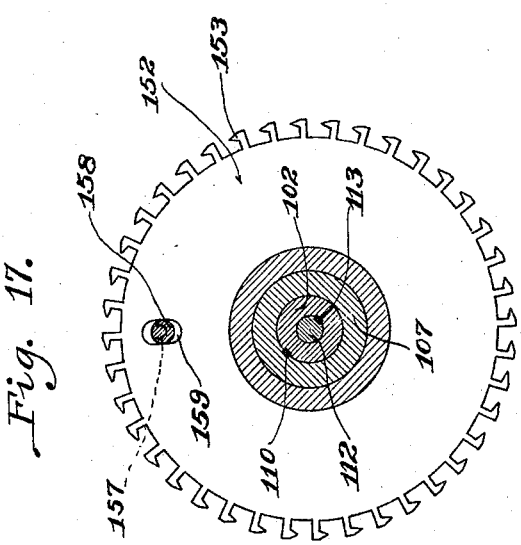
INVENTOR Nov. 8, 1927.  
L. SCHWARZMANN  
1,648,007  
GOLD LETTERING MACHINE  
Filed Dec. 4, 1923  
15 Sheets-Sheet 10

INVENTOR

Nov. 8, 1927.　　　　　　　　　　　　　　　　　　1,648,007
L. SCHWARZMANN
GOLD LETTERING MACHINE
Filed Dec. 4, 1923　　　15 Sheets-Sheet 11

INVENTOR

Nov. 8, 1927.
L. SCHWARZMANN
GOLD LETTERING MACHINE
Filed Dec. 4, 1923
1,648,007
15 Sheets-Sheet 12
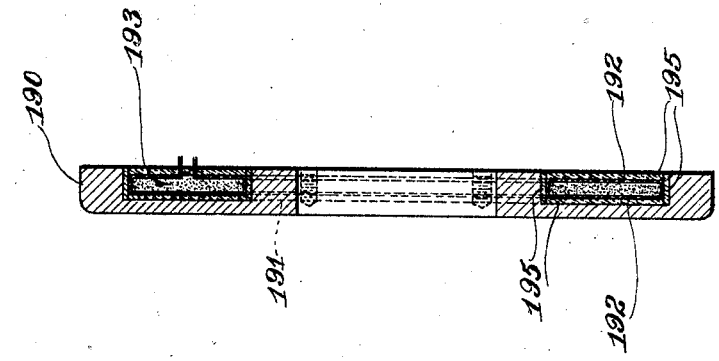
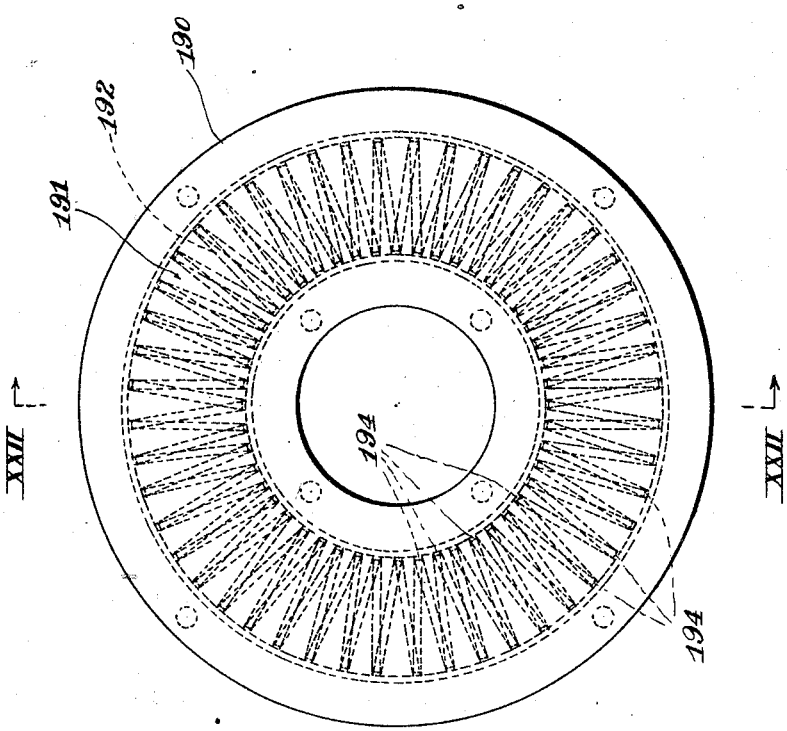
INVENTOR

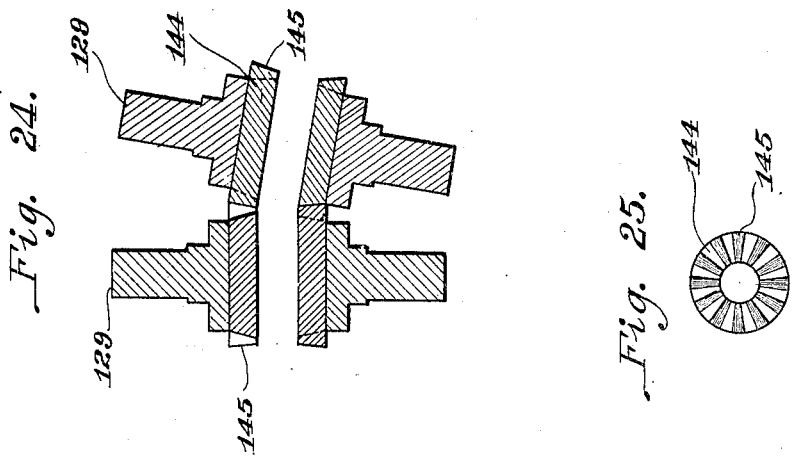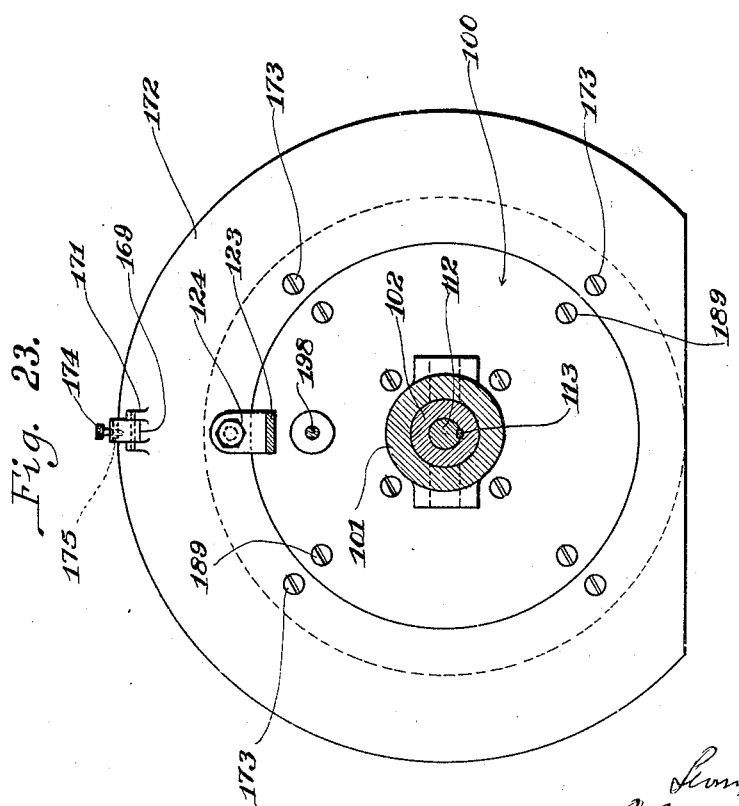

Nov. 8, 1927. 1,648,007
L. SCHWARZMANN
GOLD LETTERING MACHINE
Filed Dec. 4, 1923   15 Sheets-Sheet 14
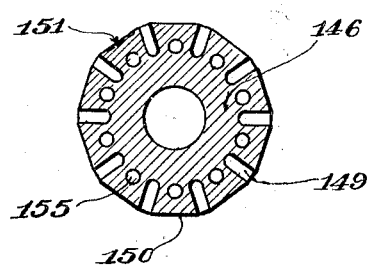
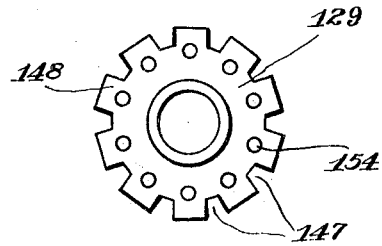
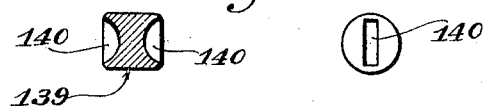
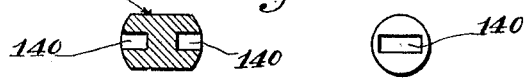
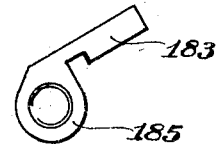
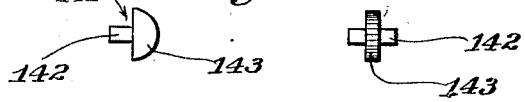
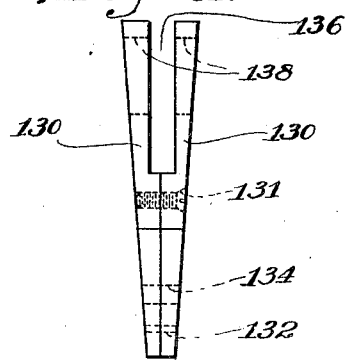
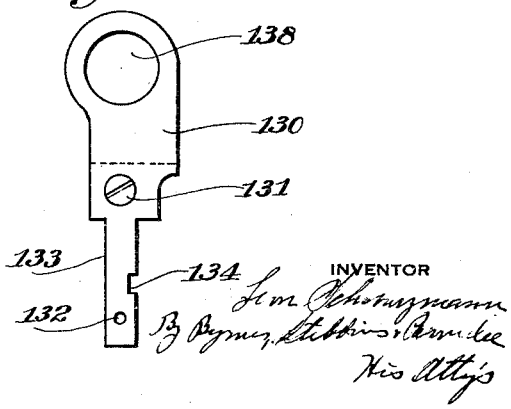
INVENTOR

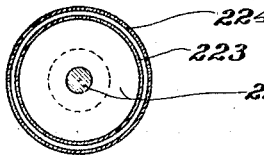

Patented Nov. 8, 1927.

1,648,007

UNITED STATES PATENT OFFICE.

LEON SCHWARZMANN, OF NEW YORK, N. Y., ASSIGNOR TO PATENTED MACHINERY DEVELOPMENT CORPORATION, OF NEW YORK, N. Y., A CORPORATION OF NEW YORK.

GOLD-LETTERING MACHINE.

Application filed December 4, 1923. Serial No. 678,435.

The present invention relates broadly to the art of printing, and more particularly to mechanism for printing with gold or other foil.

At the present time printing with gold or other foil is practiced in most of the modern jobbing bookbinderies by all-hand methods. Each line of a word or words to be impressed on the book cover,—and whenever practical more than one line at a time,—is composed of individual printing characters and individual spacers, when the latter are required, in a hand type holder called a "pallet". The pallet is then placed on a gas heater, and, when it has acquired the necessary temperature, it is applied by hand to the book cover, the latter having been previously treated with a coat of egg albumen or other adhesive substance, dried, then coated with petroleum jelly or vegetable oil to keep it in a moist condition, and then covered with gold or silver foil. The book with its cover attached is held in an upright position on the work table by a suitable clamp. The pressed contact of the heated types of the pallet with the book cover softens the egg albumen or its equivalent and effects a firm adherence of the metallic foil to the book cover. The excess foil may be removed with benzine, since the softening of the adhesive takes place only at those portions thereof with which the types make direct contact.

The above method has many objectionable features. The composition of a line with individual characters and spacers is a very slow, troublesome and tedious operation, as is also the redistribution of the types and spacers after use. It requires a great deal of skill and experience on the part of the operator to select, without error, the proper sizes of types and spacers for the composition of the pallet, in order that a book of given thickness may have the title, sub-title, author's name, etc., printed with types of the proper size and properly spaced apart, and with appropriate margins between the ends of the lines and the edges of the book cover. It often happens, moreover, that after a line has been composed, it will be found to be too long, or otherwise unsuitable, so that the types must be redistributed and the line composed anew with a different size of types and different spacings between the characters, because the only gauge used in this all-hand method for estimating the size of a given title, etc., for the space available on the book cover, is the operator's eye, which is quite fallible.

The greatest drawback in this all-hand method is not, however, in the use of individual characters, but in the handling of the pallet while making the impressions. In order to make a good job, the operator must press the pallet with its characters on the book cover in such manner that each character presents its face perfectly parallel to the work, and he must take particular care to center the line with respect to the side edges of the book cover, and to position it parallel to the top edge thereof before the types are brought into contact with the book cover, for the reason that as soon as the hot types touch the surface of the book, an impression is made and any wabbling or shifting of the pallet after commencing the impression will inevitably cause a blurred effect.

Another objection to the all-hand method is that it involves a considerable tax upon the strength and endurance of the operator in effecting the pressure of the pallet on the work, particularly when relatively large types are used, or when an especially long line of characters is employed, as when printing on the front or back side of the cover.

Where the impressions are to be made on the backbone of the cover, an additional difficulty is encountered due to the arcuate shape of the backbone, which prevents all of the characters contained in the pallet from simultaneously making contact with the backbone, as is the case when the impressions are made on the front or back of the cover, said characters being progressively brought into contact with the backbone by moving the pallet in the corresponding arc of a circle.

Still another difficulty encountered in printing on the backbone of the cover is due to the hard lumps under the relatively thin covering of the backbone formed by the sewing thread and glue which often remains unleveled by the preceding hammer or roller backing operation. These lumps, being invisible, unexpectedly interfere with the pallet, frequently causing its deviation from the intended path, and a non-uniform impression of the characters and a crooked line is the result.

In the all-hand process, where the fallible human agency alone is the controlling element of the various factors, as above pointed out, which are indispensable in the execution of a good job, errors of larger or smaller degree are unavoidable. While these errors are reduced to a minimum by the dexterity of the trained operator, they are, nevertheless, of such nature as to frequently seriously impair the appearance of the product. Furthermore, the all-hand operation is necessarily a slow one, which is an important consideration when the question of cost is to be taken into account.

By the present invention, I have provided a machine whereby these various hand operations, with their liability to error, may be effected by mechanical means with accuracy, and with more speed and without requiring as much skill or experience on the part of the operator as in the all-hand method, thereby making possible an increased production with lower operating costs.

In the accompanying drawings, there is shown, for purposes of illustration only, one embodiment of the present invention, it being understood that the drawings do not define the limits of the invention, as changes may be made in the construction and operation therein disclosed without departing from the spirit of the invention or scope of my broader claims.

In the drawings:

Figure 6 is a side elevation of the machine looking from the right, the lower portion of the frame being broken away;

Figure 7 is a longitudinal vertical sectional view, taken on the line VII—VII of Figure 1;

Figure 8 is a transverse vertical sectional view taken approximately on the line VIII—VIII of Figure 1;

Figure 9 is a sectional view taken on the line IX—IX of Figure 1;

Figure 10 is a sectional view taken on the line X—X of Figure 1;

Figure 11 is a detail view of a key member employed in the machine;

Figure 12 is a vertical sectional view of the character-marking head showing a type wheel carrier associated therewith;

Figure 13 is a view corresponding to Figure 12, but showing a plain type wheel associated with the head;

Figure 14 is a view corresponding to Figure 12, but showing a multi-pallet wheel associated with the head;

Figure 15 is a front elevation of the multi-pallet wheel, parts being broken away and parts being in section;

Figure 16 is a fragmentary sectional view of the type wheel carrier, illustrating the driving connection between the type wheels;

Figure 17 is a view illustrating the locking plate associated with the type wheel carrier;

Figure 21 is a plan view of the heating element and its housing;

Figure 22 is a sectional view taken on the line XXII—XXII of Figure 21;

Figure 23 is a view taken on the line XXIII—XXIII of Figure 12;

Figure 24 is a detail sectional view illustrating a modified form of driving connection between the type wheels;

Figure 25 is an end view of one of the driving elements shown in Figure 24;

Figure 26 is a view illustrating a master wheel;

Figure 27 is a view illustrating one of the type wheels;

Figure 28 is a view illustrating in section and in end elevation one of the driving elements shown in Figure 16;

Figure 29 is a view similar to Figure 28, the section, however, being taken at right angles to the section of Figure 28;

Figure 30 is a detail view of another driving element shown in Figure 16;

Figures 31 and 32 are an edge view and side elevation respectively of one of the elements of a pair of connected plates in which a type wheel is journaled;

Figure 33 is a detail view of an element employed in connection with the multi-pallet wheel of Figure 14;

Figure 34 is a sectional view taken on the line XXXIV—XXXIV of Figure 1;

Figure 36 is a plan view of the indicating plate forming part of the indicator device;

Figure 37 is a development of the surface of the inner tube of the indicator device;

Figure 38 is a plan view, partly in section, of the stationary and rotatable tubes of the indicator device, and Figure 39 is a sectional view taken on the line XXXIX—XXXIX of Figure 38.

Referring to Figures 1 to 7, inclusive, the machine shown comprises a horizontal rectangular frame 2 supported at a suitable elevation from the floor upon legs 3. Secured upon the front portion of this frame by means of screws 4 is a horizontal work plate 5.

Figure 1:
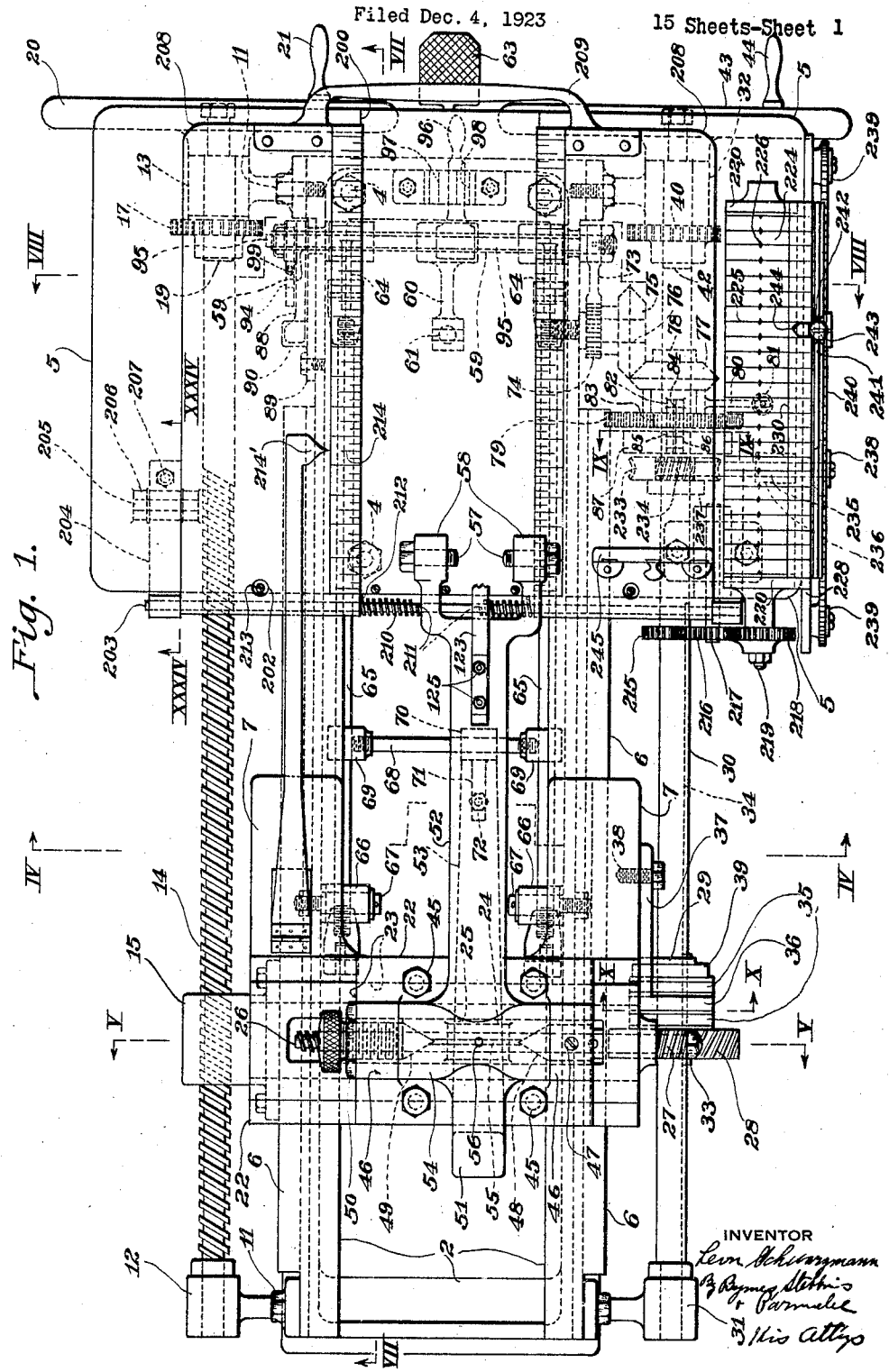
Figure 1 is a plan view of the machine.

The sides of the frame 2 are formed at their upper edges to provide rails 6 which extend from the rear end of the frame to approximately the middle of the work plate, as indicated in Figure 1. These rails have their outer edges beveled for cooperation with similarly beveled surfaces on a U-shaped slide 7 which is mounted upon said rails, a shim 8 (Figure 4), adjustable by means of screws 9 and lock nuts 10 (Figure 2), being provided for taking up wear. It will be seen by reference to Figures 4 and 10 that the rear flange of the work plate 5 is cut away to permit the front portion of the slide 7 to advance beneath the plate.

Secured to the right hand side of the frame 2, at the opposite ends thereof, by means of screws 11 is a pair of brackets 12 and 13 in which is journaled a lead screw 14 engaged by a nut 15 secured to a downwardly extending flange 16 formed integral with the right hand side of the slide 7. The lead screw has a pinion 17 mounted thereon adjacent the bracket 13, said pinion meshing with a similar pinion 18 mounted on the inner end of a short shaft 19 journaled in the lower portion of the bracket 13, said shaft having mounted on its outer end a hand wheel 20 provided with an operating handle 21. By this means, the slide 7 may be moved forwardly or rearwardly with respect to the plate 5, depending upon the direction in which the hand wheel 20 is rotated.

Mounted upon the slide 7 for movement transversely of the frame 2 is a carriage 22, the slide having a dovetailed portion 23 engaging in a similarly shaped recess in the carriage. The latter has secured thereto a nut 24 projecting into a transversely extending recess or channel 25 in the slide. This nut engages a lead screw 26 journaled in the left hand side of the slide. An end of the screw projects beyond this side of the slide and has mounted thereon a spiral pinion 27 meshing with a spiral gear 28. This gear is provided with a hub 29 through which extends a shaft 30 journaled at its opposite ends in brackets 31 and 32 secured to the left hand side of the frame 2. The hub 29 is splined to the shaft 30 by means of a key 33, shown in detail in Figure 11, engaging in a channel or keyway 34 in the shaft, said key having its ends upset to engage the opposite ends of the hub. Two sets of ball bearings 35 are mounted upon the hub, and interposed between these bearings is the forked end 36 of an angular plate 37 secured to the slide 7 by screws 38. The gear 28, bearings 35 and forked end 36 are held in the desired close relationship by means of a nut 39 threaded on the end of the hub.

The shaft 30 carries adjacent the bracket 32 a pinion 40 meshing with a pinion 41 on a shaft 42 journaled in the lower portion of said bracket 32 and having fixed upon its outer end a hand wheel 43 provided with a handle 44. It will be apparent that rotation of the shaft 30 will cause the carriage 22 to be moved in one direction or the other transversely of the frame 2 depending upon the direction of rotation of said shaft, and it will also be apparent that when the slide 7 is moved longitudinally of the frame by turning the lead screw 14, the gear 28 will be moved with the slide by reason of the engagement of the forked end 36 of plate 37 between the bearings 35, the hub being slidable on the shaft 30.

Figure 5:
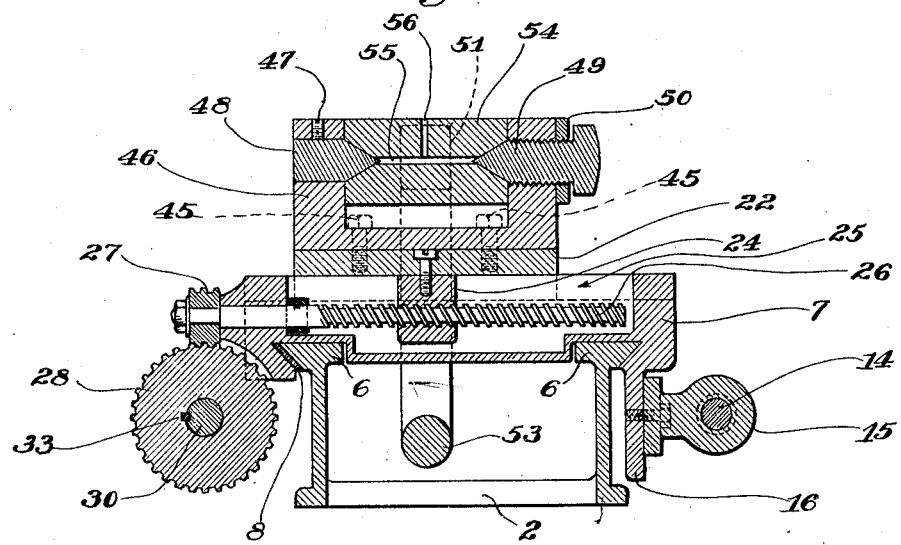
Figure 5 is a transverse vertical sectional view taken on the line V—V of Figure 1.

Secured upon the upper side of the carriage 22 by screws 45 is a U-shaped bracket 46 (Figure 5). Fixed in one of the upright arms of the bracket by means of a set screw 47 is a stud 48 having a conical inner end. A second stud 49, also having a conical inner end, is threaded through the opposite upright arm of said bracket and held in adjusted position by a lock nut 50.

The conical inner ends of the studs 48 and 49 form bearings for a substantially U-shaped member 51 (Figure 2), the upper arm 52 of which extends above the frame 2 and longitudinally thereof and is slightly longer than the lower arm 53 thereof, which extends below said frame. The upper arm 52 has a hub portion 54 adjacent the rear end thereof, in the opposite ends of which are formed cone-shaped recesses to receive said conical ends of said studs. An oil duct 55 extends through said hub portion from one recess to the other and is in communication with a second duct 56 opening at the upper side of said hub portion, whereby lubricant may be applied to said bearings. The forward free end of the arm 52 is bifurcated, and screws 57 (Figure 1) extend through the arms 58 of said bifurcated end, and constitute means for supporting a character-marking head to be hereinafter described.

At the front of the machine, beneath the work plate 5, is a rock-shaft 59 extending transversely of the frame and journaled at its opposite ends in the side members of said frame. A rearwardly extending rocker-arm 60 (Figure 1) is rigidly connected at one end to an intermediate portion of said shaft and is pivotally connected at its other end to the upper end of a connecting rod 61 (Figure 2), the latter being pivotally connected at its lower end to a lever 62 intermediate the ends of the latter. Said lever is pivoted at its rear end to the frame of the machine, and at its forward end carries a foot treadle 63. Mounted upon, and to turn with, the rock-shaft 59 adjacent the inner sides of the side members of the frame 2, is a pair of downwardly extending rearwardly curved rocker-arms 64 (Figures 1 and 7). These rocker-arms are connected by rearwardly extending parallel horizontal links 65 with a pair of similar downwardly extending forwardly curved rocker-arms 66 journaled upon studs 67 carried by the side members of the frame 2. A transversely extending rod 68 (Figures 1 and 4) is threadedly connected at its opposite ends to sleeves 69 slidably mounted upon the links 65. A sleeve 70 is slidably mounted on the rod 68 and has an integral rearwardly extending pin 71 (Figures 2 and 4) engaging in a bore in the free end portion of the lower arm 53 of the U-shaped member 51, and secured therein by a set screw 72.

It will be apparent that the operative connection between the U-shaped member 51 and the foot treadle 63 is such as not to interfere with the longitudinal movements of the slide 7 or the transverse movements of the carriage 22. The normal position of the links 65 is the full line position thereof shown in Figure 7, in which position the bifurcated end of arm 52 of U-shaped member 51 is raised. By stepping upon the foot treadle 63, the links 65 may be moved into the dotted line position thereof shown in Figure 7, thereby depressing the bifurcated end of arm 52, in order to bring the character-marking head into cooperative relation with a book cover, as will be hereinafter fully described.

Movement of the carriage 22 transversely of the frame 2 may be effected either manually, through the medium of the hand wheel 43, or automatically step by step. The latter movement is effected through means shown most clearly in Figures 1, 2, 8 and 9. Fixed upon the left hand end of the shaft 59 at the outer side of the corresponding side member of the frame 2 is a toothed segment 73. This segment meshes with a pinion 74 rigidly mounted upon the hub of a bevel pinion 75 journaled upon a stud 76 projecting from the frame 2. The bevel pinion 75 meshes with a similar pinion 77 journaled upon the shaft 30. Movement of the pinion 77 in one direction along the shaft 30 is prevented by a collar 78 fixed to the shaft, and in the other direction by a ratchet wheel 79, which is keyed to the shaft. Fixed upon the hub of the pinion 77 is a bell-crank lever, one arm 80 of which is connected by a spring 81 to the under side of the work plate 5, and the other arm 82 of which has pivoted upon the free end thereof a pawl 83 for cooperation with the teeth of ratchet wheel 79. The pawl 83 is fixed upon a pivot pin 84 (Figure 9), and this pivot pin carries a downwardly extending rocker-arm 85 carrying a roller 86 at its lower end. This roller engages the periphery of a cam disk 87 journaled upon the shaft 30 at the side of ratchet wheel 79 opposite the pinion 77. This cam disk is adapted to be angularly adjusted by means to be hereinafter described.

The operation of the parts described in the preceding paragraph is as follows: When the foot treadle is depressed, the pinion 77 is rotated in a counter-clockwise direction, as viewed in Figure 8. This counter-clockwise rotation of the pinion has no effect upon the shaft 30, since said pinion is rotatable freely upon said shaft. However, bell-crank lever arms 80 and 82 rotate with the pinion, thereby putting spring 81 under tension, and causing pawl 83 to ride freely over the teeth of the ratchet wheel 79. The movement of arm 82 in the counter-clockwise direction carries roller 86 off of the low portion of cam disk 87 on to the high portion thereof, thereby swinging pawl 83 clear of the teeth of the ratchet wheel. When the operator takes his foot off of the foot treadle 63, the spring 81 immediately rotates the arms 82 and 83 and pinion 77 in a clockwise direction. The first portion of this rotation of these parts has no effect upon shaft 30 by reason of the engagement of the roller 86 with the high portion of cam disk 87. As soon, however, as the roller moves onto the low portion of the cam disk, the pawl 83 drops into engagement with the teeth of the ratchet wheel 79, causing the latter to be rotated in a clockwise direction with the arm 82. If desired, a light spring may be associated with the pawl 83 for insuring its engagement with the teeth of the ratchet wheel. Since the ratchet wheel 79 is keyed to shaft 30, the latter will be rotated with arm 82 to thereby effect a slight transverse movement of the carriage 22 to the right during the raising of arm 52 of U-shaped member 51. Obviously, the extent of this transverse movement of the cariage during the raising of arm 52 may be varied by adjusting the cam disk 87 angularly on shaft 30. As a matter of fact, the cam disk 87 may be so adjusted that no transverse movement of the carriage 22 will take place upon the raising of the arm 52.

Means is provided for cooperation with the means thus described, in order to insure that the movements of the foot treadle, and hence the raising and lowering movements of the character-marking head and the rocking movements of the bell-crank lever arms 80 and 82 shall be perfectly uniform and limited in their scope. Referring to Figure 6, an arm 88 is secured at one end upon the right hand end of shaft 59 at the outer side of the corresponding side member of frame 2. Interposed between this arm and the side of the frame is a segmental plate 89 having two integral lugs 90 and 91. The upper lug 90 forms a fixed stop for limiting upward movement of arm 88 under the influence of the spring 81 (Figure 8). Extending through the lower lug 91 is a screw 92 forming an adjustable stop for limiting downward movement of said arm. The lower lug 91 is provided with a beveled extension 93, on which slides the free end of a stop lever 94 fixed upon the right hand end of a transverse shaft 95 parallel to and underlying the shaft 59 (Figures 7 and 8). The shaft 95 is journaled in the side members of the frame 2 and is adapted to be displaced longitudinally. For this purpose, the shaft is provided intermediate its ends with a handle 96 extending forwardly through a yoke 97 (Figures 1 and 3) carried by the frame 2. This yoke is provided with two downwardly facing V-shaped notches 98 for cooperation with the similarly shaped upper edge of said handle. A spring 99 attached at one end to the lever 94, and at its other end to the frame 2, tends to rotate said lever in a clockwise direction. To shift the shaft 95 and lever 94 to the right or left, it is only necessary to depress the handle 96 to disengage it from one of the notches 98 and then move it to the right or left to bring its V-shaped upper edge opposite the other notch. Upon release of the handle, spring 99 will swing it upwardly into engagement with said other notch. When stop lever 94 is shifted to the left, it underlies arm 88 and prevents the latter from engaging screw 92 when the foot treadle is depressed, the upper surface of the end of said stop lever engaged by said arm being at a slightly higher elevation than the end of the screw. Under these conditions, the character-marking head will not reach its normal lowermost position upon depression of the foot treadle, and hence no impression will be made upon the book cover, but a feeding movement of the carriage to the right will take place nevertheless upon the raising of the head by the spring 81.

From the foregoing, it will be understood that when the stop lever 94 is shifted to the right to its inoperative position, downward movement of the foot treadle will be limited by engagement of the arm 88 with the screw 92, and the character-marking head will descend far enough for an impression to be made upon the book cover supported upon the work plate 5. On the other hand, upward movement of the character-marking head will be limited by the engagement of the arm 88 with the upper fixed stop 90. During this upward movement of the head, the lever arm 82 will move in a clockwise direction, thereby effecting, through the engagement of pawl 83 with ratchet wheel 79, a movement of the carriage 22 to the right and a corresponding movement of the head, thereby positioning the latter for the succeeding impression.

The intermittent movements of the carriage 22 by reason of the raising and lowering of the head as above explained, will be at a maximum when the cam disk 87 is adjusted to a position such that the roller 86 is not affected by the high portion thereof during the movements of the lever arm 82, but engages the low portion only of the cam disk during such movements. However, as different kinds of work require different spacings of the head in accordance with the size of type employed, the number of characters in the line and the length of the line, it is essential that the automatic spacing steps should be variable at will. This result is obtained by adjusting the cam disk 87 so that the roller 86 will travel over a greater or less extent of the high portion of the cam disk during the movements of the lever arm 82. Thus, if the cam disk is so adjusted that the roller engages only the high portion of the cam disk during the movements of the lever arm 82, the spacing movements of the carriage 22 and head will become zero. When this latter condition obtains, the automatic step by step spacing mechanism is "out of gear" or disconnected, and manual operation of the carriage 22, either to the right or to the left by means of the hand wheel 43, is permitted. This out of gear condition of the automatic spacing mechanism is necessary for bringing the carriage back to its starting position at the left after a word or a line has been printed.

It will be apparent that by adjusting the cam disk 87 to different positions, as desired, the automatic spacing of the head may be varied by degrees between zero and a maximum. This will be better understood by the following illustration: Let it be assumed that the ratchet wheel 79 has seventy-two teeth, and that the normal movement of the lever arm 82, when the stop lever 94 is in inoperative position, is through an angle of 120 degrees. When this is the case, at each movement of the lever arm 82 in a counter-clockwise direction, the pawl 83 will move over twenty-four of the seventy-two teeth of the ratchet wheel, and in the movement of the lever arm in the clockwise direction, the ratchet wheel will be turned a distance corresponding to twenty-four teeth on its periphery, provided the cam disk 87 has been adjusted to such a position that the roller 86 engages only the low portion of said disk during the movements of the lever arm 82. If the cam disk be now adjusted so that its high portion is engaged by the roller 86 when the pawl 83 in its counter-clockwise direction of movement has just passed over the tenth tooth, for example, then the pawl in its clockwise direction of movement, for a distance corresponding to fourteen teeth of the ratchet wheel, will be out of engagement with the teeth of the ratchet wheel, but as soon as the roller 86 reaches the low portion of the cam disk, the pawl 83 will drop into engagement with the teeth of the ratchet wheel, and the latter will be turned in a clockwise direction through a distance equivalent to the remaining ten teeth. In this example, it will be seen that the cam disk may be adjusted so as to obtain twenty-four variations in the spacing movements of the carriage 22 and the character-marking head, these variations differing from each other by an amount equivalent to one tooth of the ratchet wheel. Obviously, the example given is only an arbitrary one, and it will be apparent that any number of variations might be provided to suit particular requirements, and that the "fineness" of adjustment may be varied by increasing or decreasing the number of teeth on the ratchet wheel.

Different forms of character-marking means are illustrated in Figures 12, 13 and 14. The character-marking head previously referred to comprises a heating plate 100, the hub portion 101 of which is engaged by the screws 57. A sleeve 102 is rotatably fitted in said hub and has an integral collar 103 seating in a recess in said heating plate. In order to prevent separation of the sleeve 102 from said hub portion, said sleeve has its rear end reduced and screw-threaded to receive a washer 104 and nut 105, said washer engaging the rear end of said hub portion, and said nut holding said washer in place. The sleeve 102 is screw-threaded near its outer end to receive a nut 106, and held upon said sleeve between said nut and the collar 103 is the hub portion of a type wheel carrier (Figure 12), plain type wheel (Figure 13), or multi-pallet wheel (Figure 14), a key 110 preventing relative rotation between said sleeve and hub portion. The outer end portion of said sleeve 102 is of reduced diameter, and has mounted thereon a handle 111 of fibre or other material which is a poor conductor of heat. A rod 112 extends through the sleeve 102 and projects at both ends beyond the ends of said sleeve, said rod being splined to said sleeve by means of a key 113. Said rod has its upper end screw-threaded and tapped into said handle 111. Surrounding said rod between the upper end of the sleeve 102 and a nut 114 on said screw-threaded end of the rod is a coil spring 115. The portion of the handle fitting over the reduced portion of the sleeve has a screw 116 passing therethrough, the inner end of said screw engaging in a slot 117 in said reduced portion of said sleeve. This screw and slot connection causes the sleeve to turn with the handle, but enables the rod 112 to be moved longitudinally with respect to the sleeve in opposition to spring 115, by pushing upon the handle 111.

Mounted upon the lower projecting end of the rod 112 is a wheel 118 having a toothed beveled periphery, the arm 52 having a recess 119 therein to accommodate said wheel. Cooperating with the teeth on wheel 118 is a fixed tooth 120 secured to hub portion 101 by screws 121, said screws extending through transverse slots 122 in said tooth. The character-marking head is held in the correct angular position with respect to arm 52 by means of a strap 123 connected at its opposite ends to the rear face of the heating plate 100, and to the upper side of said arm, respectively, by screws 124 and 125. The screws 125 extend through slots 126 in the strap. The slots 122 and 126 provide for the lateral adjustment of tooth 120 and the angular adjustment of the head, in order to insure that the marking characters, when in marking or printing position, shall present their faces parallel to the work. It will be apparent that any required angular adjustment of the head will be so slight that the spring in strap 123 will permit such adjustment without the requirement of a hinged joint in such strap. However, such joint could be provided if necessary.

Referring to Figure 12, the type wheel carrier comprises a plate 107 integral with the hub thereof. This plate has a peripheral portion 127 of reduced thickness. The hub portion of the type wheel carrier is screw-threaded at the outer side of plate 107 to receive a plate 128, of the same diameter as plate 107, which is screwed onto said hub portion into contact with said plate 107. Type wheels 129 are rotatably supported in members 130 shown in Figures 31 and 32, said members being secured together in pairs by means of screws 131 and pins 132. Each of said members has a shank portion 133 of reduced width provided with a notch 134 therein. The assembled pairs of members 130 have their shank portions 133 positioned in the space between the plate 128 and the reduced portion 127 of plate 107, and the said reduced portion is provided with an annular rib 135 interlocking in said recesses 134 to hold said members 130 in position. Each type wheel is positioned in a space 136 between the body portions of a pair of connected members 130, and has a hollow hub 137 journaled in openings 138 in said members.

All of the type wheels are interconnected to be rotated in unison in either direction. One method of interconnecting these wheels is illustrated in Figure 16, and the parts constituting the connecting means are illustrated in Figures 28, 29 and 30. Each type wheel has a bushing 139 secured against rotation in its hollow hub. Each bushing has a half-round flat sided recess 140 in each end thereof. These bushings are connected by links 141, each consisting of two integral half-round flat sided portions 142 and 143 positioned in planes at an angle of 90 degrees to each other, and fitting in said recesses 140 of the bushings 139. The interconnected bushings 139 and links 141 form a flexible drive shaft for the type wheels having universal joints.

Another method of interconnecting the type wheels is illustrated in Figures 24 and 25. In this form of connection, a bushing 144 is fixed against rotation in the hollow hub of each wheel. Each bushing is provided at its opposite ends with teeth 145 meshing with similar teeth on the adjacent ends of the adjacent bushings, whereby all of the type wheels are interconnected to turn in unison. Of course, it will be understood that the sides of these teeth are inclined at a suitable angle, as illustrated in Figure 25, in view of the angular arrangement of the type wheels, as illustrated in Figure 24.

While I have described the type wheels 129 as having hollow hubs, these hubs may be formed solid, if desired. In that case, in the form of driving connection shown in Figure 16, the slots 140 would be made in the ends of the hubs. Likewise, in the form of driving connection shown in Figures 24 and 25, the teeth 145 would be formed upon the ends of the hubs.

All of the type wheels 129, except one, the latter constituting a master wheel 146, are alike as to form, except that the marking characters on the periphery of each wheel are distinct from those on every other wheel. Each type wheel is provided with a plurality of equally spaced radial grooves 147 forming an equal number of projections 148 on its periphery. A type wheel is shown in side elevation in Figure 27, and it will be seen that said wheel is provided with ten grooves and ten projections, although the number of grooves and projections may obviously be varied. The master wheel, which is shown in Figure 26, instead of having radial grooves, is provided with radial orifices 149 corresponding in number to the grooves 147 and adapted to be engaged by a suitable tool for rotating the master wheel and connected type wheels.

Figure 20:
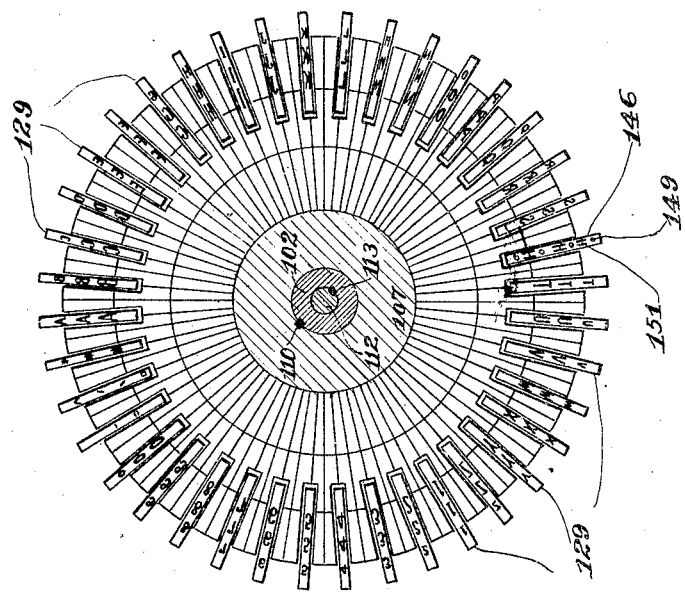
Figure 20 is a view illustrating the type wheel carrier with certain parts removed and certain parts in section.

The end face of each projection 148 is flat and has a marking character, such as a letter of the alphabet, numeral, punctuation mark, ornamental design or the like, engraved or otherwise formed thereon. A complete set of characters may comprise, for example, all of the letters of the alphabet, the numerals 1 to 9, inclusive, and other desirable characters. Such set will be formed on the entire series of type wheels by forming one character of such set on one projection 148 of each wheel. In the construction illustrated, there are ten projections on each type wheel, and hence ten complete sets of characters may be provided. Each set of characters will be distinct from every other set as to size or style, or both. For example, one set may be of capitals, roman style, the next one of the same style but of smaller size. The next one of capitals, gothic style, etc. The characters on all of the projections 148 of the same wheel are the same in kind, but each character on such wheel is different from every other character on that wheel as to size or form, or both. In other words, each type wheel will have only corresponding characters of the several sets. For example, one type wheel may have different styles of the letter H, and another different styles of the letter M, and so on, as will be apparent by reference to Figure 20. Furthermore, the type wheels will be assembled on the type wheel carrier in such manner as to bring the characters of each set in alignment about the periphery of the type wheel carrier, so that one set of characters may be moved out of operative position and another brought into operative position by inserting a suitable tool in an orifice 149 of master wheel 146 and turning said wheel in one direction or the other. In order that the various sets of characters available may be readily identified in making their selection, on the flat peripheral faces 150 of the master wheel, intermediate the orifices 149, are engraved or otherwise formed suitable identification marks 151 (Figure 18) of the same style as the style of characters of the corresponding set. Preferably, the letter H will be employed as such an identification mark, because its form peculiarly adapts it for that purpose.

The provision of a plurality of complete sets of characters, together with means whereby any desired set may be readily and quickly brought into operative position, is one of the important features of the invention which renders it practical. This will be apparent when it is considered that almost every book requires more than one set of characters for the proper impression of its title, sub-title, author's name, etc., as many as six different kinds of characters often being used for a single book. Moreover, the kind of characters used for a book of one-half inch thickness is utterly unsuitable for books of larger size, such as encyclopedias, for example.

It is essential that after a set of characters has been brought into operative position by turning the master wheel 146, it should be positively locked in such position in order that the characters may be correctly presented to the work. For this purpose, a locking plate 152 (Figure 17) is provided, having on its periphery a plurality of laterally projecting tapered teeth 153 corresponding in number to the number of type wheels 129. These teeth are adapted to extend into openings 154 in the type wheels at the bases of the projections 148, and into corresponding openings 155 in the master wheel. Referring to Figure 12, the locking plate 152 is rotatably mounted upon the hub of plate 128, and when it is in inoperative position, all of the teeth 153 are out of engagement with the openings 154 and 155, such teeth then being located in the spaces between the type wheels, and in this position of the locking plate, free rotation of the type wheels is permitted. In order to rotate the locking plate into and out of locking position, an operating lever 156 has a pivot pin 157 journaled in plate 128, said pin being provided with an eccentric portion 158 engaging in a radial slot 159 in the locking plate (Figure 17). The lever 156 lies at the outer side of an indicating cover plate to be hereinafter described, and has an operating knob 160 provided with a pin 161 extending through the lever and adapted to be projected into either of two holes 162 and 163 (Figure 18) in said indicating plate by pushing upon the knob, to thereby hold the locking plate in either the "on" or "off" position. To unlock the type wheels, the knob 160 is pulled outwardly to cause the withdrawal of the pin 161 from the hole 162 and the lever 156 is swung in the direction of the "off" marking. During this motion of the lever, the eccentric 158 engaging in the slot 159 effects a slight turning of the locking plate 152 to thereby cause the disengagement of the teeth 153 from the type wheels and master wheel. To lock the type wheels in the selected position, the operating lever 156 is merely turned in the opposite or "on" direction, thereby causing the engagement of the teeth 153 with the type wheels and master wheel.

The indicating plate hereinbefore referred to is designated by reference numeral 164. This plate is conveniently shaped to cover a portion of the type wheels without touching the same, and is mounted upon the hub of plate 128, and it and the locking plate 152 are held in position on said hub by a nut 165 on the hub portion of the type wheel carrier, whereby said plates rotate as a unit with the type wheel carrier.

Figure 18:
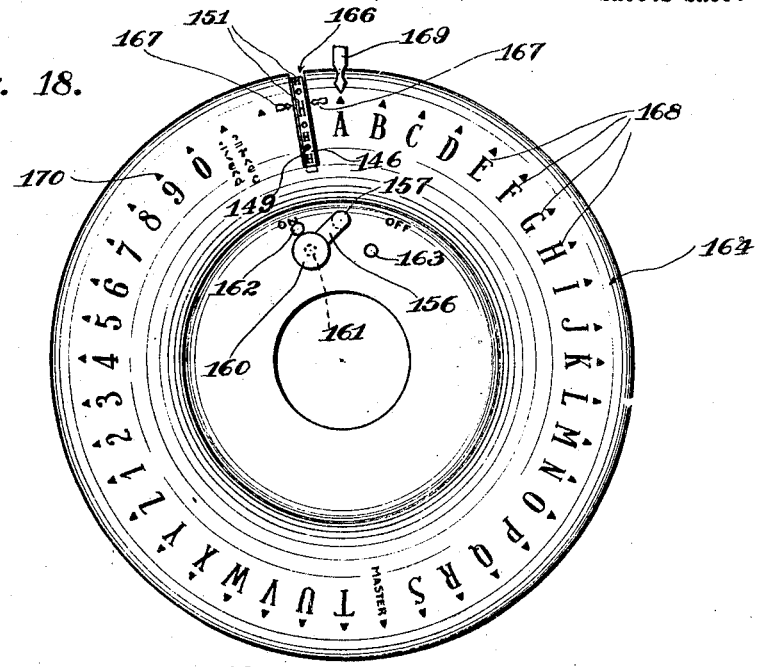
Figure 18 is a plan view of the indicating plate associated with the type wheel carrier illustrated in Figure 12.

By reference to Figure 18, it will be seen that the indicating plate 164 is provided with a radial slot 166, two small arrows 167 at the edges of said slot cooperating with the identification marks 151 on the master wheel to indicate the position of the latter. On the face of the plate 164 are embossed or otherwise formed letters of the alphabet, numerals, etc. 168, corresponding exactly to the characters available on the type wheels and arranged in the same sequence as the characters in the several sets on said wheels. However, for convenience, the characters on the face of the plate 164 do not directly overlie the type wheels having the corresponding characters thereon, but are positioned diametrically opposite to such wheels. In other words, when a type wheel having marking characters A thereon, for example, is at the bottom of the type wheel carrier in correct printing position, its corresponding identification mark A will be at the top of the character indicating plate 164 opposite a fixed pointer 169.

To bring any desired character into the operative or printing position, the handle 111 is pressed rearwardly, thereby moving the toothed wheel 118 out of engagement with the fixed tooth 120, and permitting free rotation of the handle 111 and type wheel carrier. After the latter has been rotated in either direction until the desired character on the indicating plate 164 is opposite the fixed pointer 169, the handle 111 is released, and the spring 115 immediately moves the handle upwardly and forwardly and causes the re-engagement of the toothed wheel 118 with the fixed tooth 120, thus automatically locking the type wheel carrier in the selected position.

The pointer 169 cooperates with the triangular marks 170 above the characters 168 marked on the indicating plate 164. This pointer is of arcuate form and has a hinged connection 171 with a hood 172 which is secured to the heating plate 100 by screws 173 (Figure 23). When it is desired to remove the type wheel carrier from the sleeve 102, the pointer 169 may be swung rearwardly about its hinged joint 171. Said pointer is secured in operative position by means of a screw 174 extending through the pointer and tapped into the hood, said screw having an integral collar 175 thereon interposed between the hood and the pointer to maintain the latter at the proper distance from the revolving character indicating plate 164.

The character indicating plate 164 and hood 172 are so shaped as to substantially cover the type wheels and thereby keep the heat supplied by the heating means, to be hereinafter described, concentrated around the marking characters, and also protect the latter from dust and accidental injury. The hood is cut away at its lower portion so as not to interfere with the marking characters coming into contact with the work.

The type wheel construction shown in Figure 12, with its several complete sets of characters of varying size and form, is adequate to do almost any work in jobbing bookbinderies under ordinary conditions. However, there are cases where unusual kinds of characters are required, as, for example, characters of unusual size or form, or characters representing letters say of the Greek alphabet, or of some other foreign language. Under these conditions, the ordinary type wheel carrier and its associated parts may be removed from the sleeve 102, and another type wheel carrier of similar construction positioned thereon, but carrying type wheels having marking characters thereon of the kind to suit the special requirements of the particular case.

Figure 19:
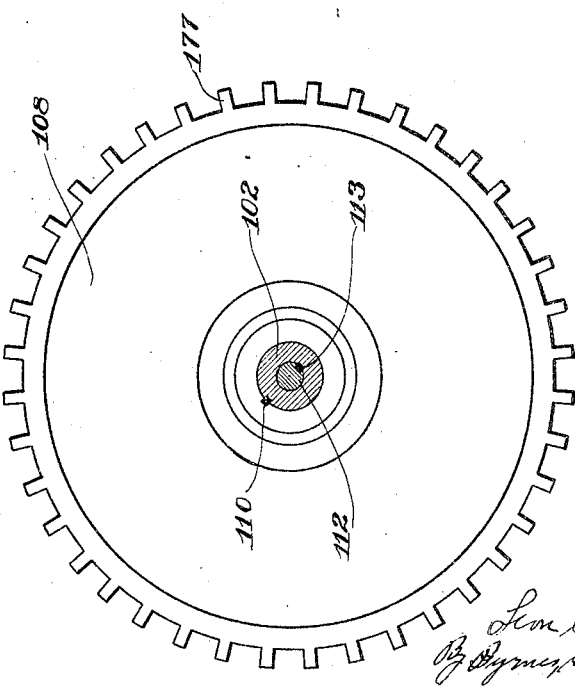
Figure 19 is a view illustrating the plain type wheel.

On the other hand, in cases where only a few unusual kinds of characters are required in addition to those of ordinary kind provided on the type wheels carried by the ordinary type wheel carrier with which the machine will always be equipped, a plain type wheel 108, such as is illustrated in Figures 13 and 19, may be provided, such type wheel having a hub portion surrounding the sleeve 102 and keyed thereto by the key 110, said hub portion being clamped between collar 103 and nut 106. Said hub portion has a character-indicating plate 176 secured thereon and clamped in place by the nut 165. This plain type wheel 108 will have only one complete set of characters, such as letters of the alphabet, numerals or other characters required for the special work, engraved or otherwise formed on its peripheral projections 177, said characters being arranged to cooperate with the character-indicating plate 176 and pointer 169.

It is sometimes desirable, as, for example, when a few books of the same size, title, sub-title, author, etc., are to be lettered, to compose the title, sub-title, etc., and print each of the same at a single depression of the foot treadle. This may also be the case where a special job is to be done at short notice requiring Russian or German characters of the alphabet, for example. In such cases, the provision of a plain type wheel with these characters engraved thereon would not be economical or practical, in view of the short time available; therefore, it is desirable to use loose printing characters for the work. For this special purpose, a multi-pallet wheel, such as shown in Figures 14 and 15 may be employed. This multi-pallet wheel has a hub portion surrounding the sleeve 102 and clamped thereon between the collar 103 and nut 106, said wheel being keyed to said sleeve by the key 110. Integral with the hub portion is a plate 109, preferably formed as a regular polygon and having its edge portions 178 inclined at an angle to the body portion thereof. Fitting over said hub portion and lying against the outer face of the plate 109 is a plate 179 secured to said plate 109 by screws 180, said plate 179 also being in the form of a regular polygon, and having its edge portions 181 terminating flush with edge portions 178 of plate 109 and extending parallel thereto. The edge portions 178 and 181 are spaced apart to provide channels to receive printing characters 182 forming the pallets. The characters in each pallet are clamped together and held in position in said channels by means of clamping members 183, one of which is shown in detail in Figure 33. The two clamping members engaging the opposite ends of a line of characters are moved towards and from each other to clamp or release said characters by means of a right and left screw 184, the threaded portions of which extend through and engage in threaded openings in the enlarged circular inner ends 185 of said members. These enlarged ends slide in enlarged extensions of the channels which receive the characters. Each screw has a squared end 186 adapted to be engaged by a suitable tool for turning said screw. The loose printing characters, which may be of different sizes for each pallet, if desired, are assembled or composed in the various pallets similarly as in the all-hand operation mentioned at the beginning of this specification. After pallet No. 1 has been composed of the author's name, for example, the screw 184 is turned in the proper direction to bring the clamping members 183 into clamping engagement with the characters in that pallet. Then pallet No. 2 may be composed for the title by a similar operation, and pallet No. 3 for the sub-title, and so on.

Fitted on the hub portion of the multi-pallet wheel is a character-indicating plate 187 held in place by the nut 165. The indicating plate has only as many indicating marks 188 thereon as there are pallets. These marks may be simply numerals, as shown in Figure 15.

In operation, the multi-pallet wheel is turned to bring the desired pallet into operative position by manipulating the handle 111, as previously explained for the type wheel carrier, and the foot treadle depressed. This causes the impression of the full line of characters in that particular pallet at the one depression of the foot treadle. Thereafter, the handle 111 may again be manipulated to bring another of the pallets in operative position, and the operation repeated.

In order to remove the type wheel carrier and substitute another type wheel carrier or a plain type wheel or a multi-pallet wheel, the screw 116 is unscrewed enough to remove its inner end out of the slot 117, and the handle 111 is then unscrewed from the rod 112. During the latter operation, the handle 111 is not pressed, as this would cause disengagement of the toothed wheel 118 from the fixed tooth 120, and the consequent rotation of the type wheel carrier. On the contrary, a slight outward pull is exerted upon the handle during the unscrewing thereof. After the removal of the handle, the nut 106 is removed, thereby permitting the type wheel carrier and associated parts, including the indicating plate 164, to be removed. Another type wheel carrier, or a plain type wheel, or a multi-pallet wheel may then be substituted, and the nut 106 and handle 111 replaced, and the screw 116 screwed inwardly to move its inner end into the slot 117.

In gold or other foil lettering processes, the marking characters must be at a determined temperature of from 180° to 220° F. to soften the adhesive, and thereby cause the sticking of the foil employed. Electrical heating means is preferably employed for this purpose, for the reason that it insures perfect cleanliness, requires a comparatively small space for the housing of the heating element, and enables a constant temperature to be maintained. Furthermore, the temperature can be readily controlled where electrical heating means is employed. Other than electrical means may be employed, however, if desired.

The heating element and the means for housing the same are illustrated in detail in Figures 21 and 22. The housing means consists of a plate 190 adapted to be secured upon the inner face of the heating plate 100 by means of screws 189 so as to be positioned in the space between said plate and the type wheel carrier, plain type wheel or multi-pallet wheel, as the case may be. This housing plate has an annular chamber 191 therein, and positioned in this chamber is an electric heating element 192 in the form of a ribbon of high ohmic resistance material spirally wound on a mica core 193 having the shape of a flat ring. In order that the turns of the spiral ribbon may be spaced apart to prevent short-circuiting, the inner and outer peripheral edges of the mica core are provided with suitable notches 194 to receive said turns. The core and ribbon are enclosed in sheets of mica 195. The terminals of the heating element are taken out through an insulating bushing 196 (Figures 12, 13 and 14), and are connected to a plug 197 of a flexible conductor 198 which passes through a bushing 199 secured to strap 123. This flexible conductor may be connected with an electric lamp socket or other suitable source of electric current. The temperature of the heating element may obviously be controlled by means of a rheostat in the electric circuit. Furthermore, if desired, the heating element may be divided into two or more parts, each adapted to be connected with the source of current by its own individual switch.

To facilitate centering a book cover on the work plate 5, the latter is recessed to receive a relatively thin plate 200 (Figures 3 and 35) having graduations 201 on its upper face, the zero marks being located along the center line of the plate 5. The book cover is placed flat on the work plate 5 with its backbone over approximately the center portion of the plate, and then said cover is shifted to the right or left until the side edges of said backbone are in line with identical graduation marks on opposite sides of the zero marks. In order that the graduation marks may always be close to both ends of the backbone to facilitate said centering, regardless of the size of the book cover, the graduations 201 are repeated at intervals lengthwise of the plate 200. In order that the book cover may always be placed square with the work plate 5, stops 202 are provided near the rear edge of said plate at opposite sides of the plate 200, said stops, as shown, being in the form of small studs screwed into the plate 5. Any other form of stops may be employed, however.

Figure 4:
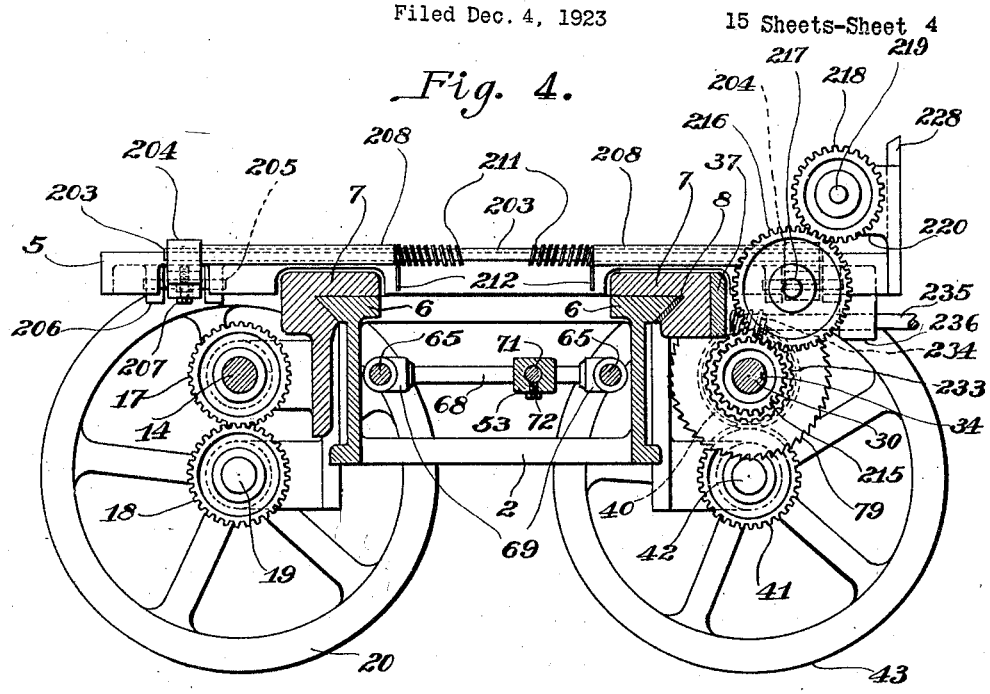
Figure 4 is a transverse vertical sectional view taken on the line IV—IV of Figure 1.
Figure 35:
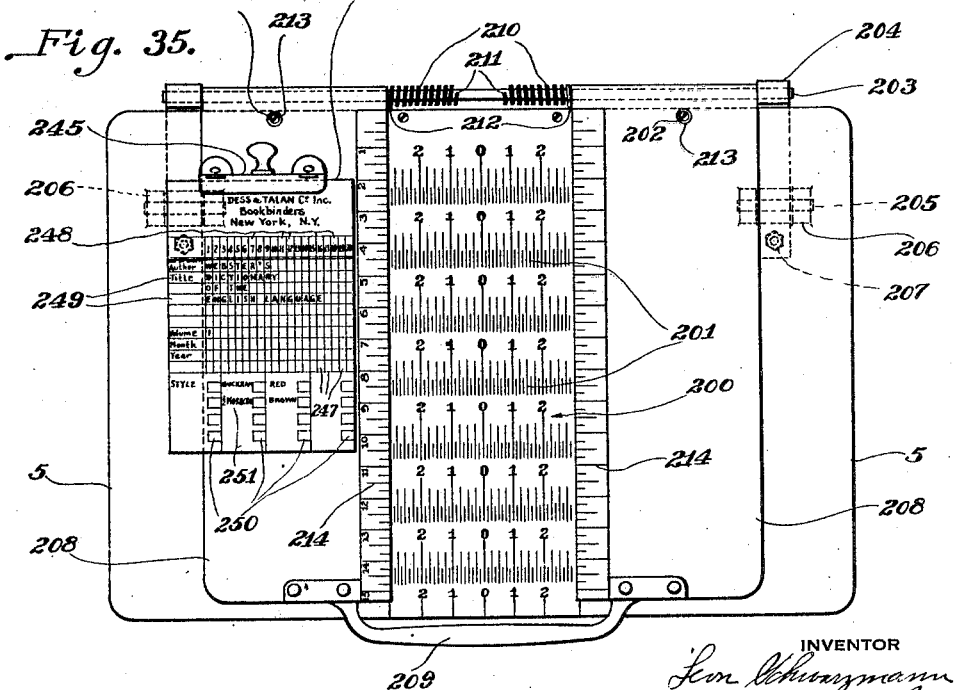
Figure 35 is a plan view of the work plate and the clamping plates and indicating plate associated therewith.

To firmly hold the book cover in the centered position during the printing operations, book cover clamping means is provided. The latter comprises a rod 203 extending adjacent and parallel to the rear edge of the work plate 5 (Figures 1, 5 and 35). This rod is journaled at its ends in the rear ends of levers 204 (Figures 34 and 35). These levers extend under the rear portion of the work plate 5 and each carries intermediate its ends a pivot pin 205 journaled in ears 206 depending from the under side of said work plate. A set screw 207 is threaded through the forward end of each lever and engages the under side of said plate. Two clamping plates 208 overlie the plate 5 at opposite sides of plate 200, and are connected at their forward ends by means of a handle 209. Each clamping plate has its rear end bent about the rod 203 so that the latter turns with said plates. Two coil springs 210 surround the rod 203 intermediate plates 208, and each has one end 211 extending through the rod and its other end 212 abutting against the rear edge of work plate 5 (Figure 4). These springs exert their tension to yieldingly clamp the book cover between the clamping plates and the work plate. The lever supports 204 for rod 203 allow the clamping plates to automatically adjust themselves to varying thicknesses of book covers. The clamping plates have apertures 213 therein for the stops 202 to extend through, so that said stops do not interfere with said clamping plates when the latter are in clamping position. The clamping plates are preferably spaced apart so as not to interfere with the character-marking means, and said plates have their inner longitudinal edges provided with graduations 214 to indicate the position of the character-marking head longitudinally of the book cover. For this purpose, a pointer 214' is carried by the slide 7 for cooperation with the graduations 214.

In order to enable the operator to set the master wheel 146 and adjust the cam disk 87 for the size of type and automatic spacing of the carriage which will give the best results as to appearance of the work, and in order further to enable him to locate each line of characters exactly in the middle of the backbone of the book cover, so that there will be equal margins at the opposite ends of the lines, the machine is provided with an indicator device. This indicator device will now be described.

A gear 215 is keyed to the shaft 30 and meshes with a gear 216 fixed on a shaft 217 journaled in bearings secured to the under side of the work plate 5. The gear 216 meshes with a gear 218 fast on the end of a shaft 219. The latter is journaled at its ends in two brackets 220 secured to the left hand edge of work plate 5 by screws 221.

By reference to Figure 38, it will be seen that shaft 219 has three collars 222 integral therewith, and upon which a thin tube 223 is mounted so as to rotate with said shaft. Surrounding the tube 223 is another tube 224 of glass or similar transparent material, said tube 224 being of slightly greater internal diameter than the external diameter of tube 223, so as to leave a slight space between said tubes. The tube 224 is supported at its ends by the brackets 220 so as to be non-rotatable.

The tube 224 has a plurality of uniformly spaced circumferentially extending lines 225 painted or otherwise provided on its surface, and each line has associated therewith arrow heads 226, all of said arrow heads being located in a line on the surface of the tube parallel to the axis thereof.

On the surface of the tube 223 a plurality of circumferential columns 227 are marked. These columns are graduated by dividing them into spaces and placing a number in each space. A column 227′ is provided at the extreme left of the columns 227 and is graduated in inches and fractions thereof. These columns could, of course, be marked on a piece of paper or parchment and the same pasted over the tube. The columns are so arranged on tube 223 that the lines 225 on transparent tube 224 are located centrally over the same. Figure 37 shows a development of the surface of the tube 223 with its graduated columns.

Figure 2:
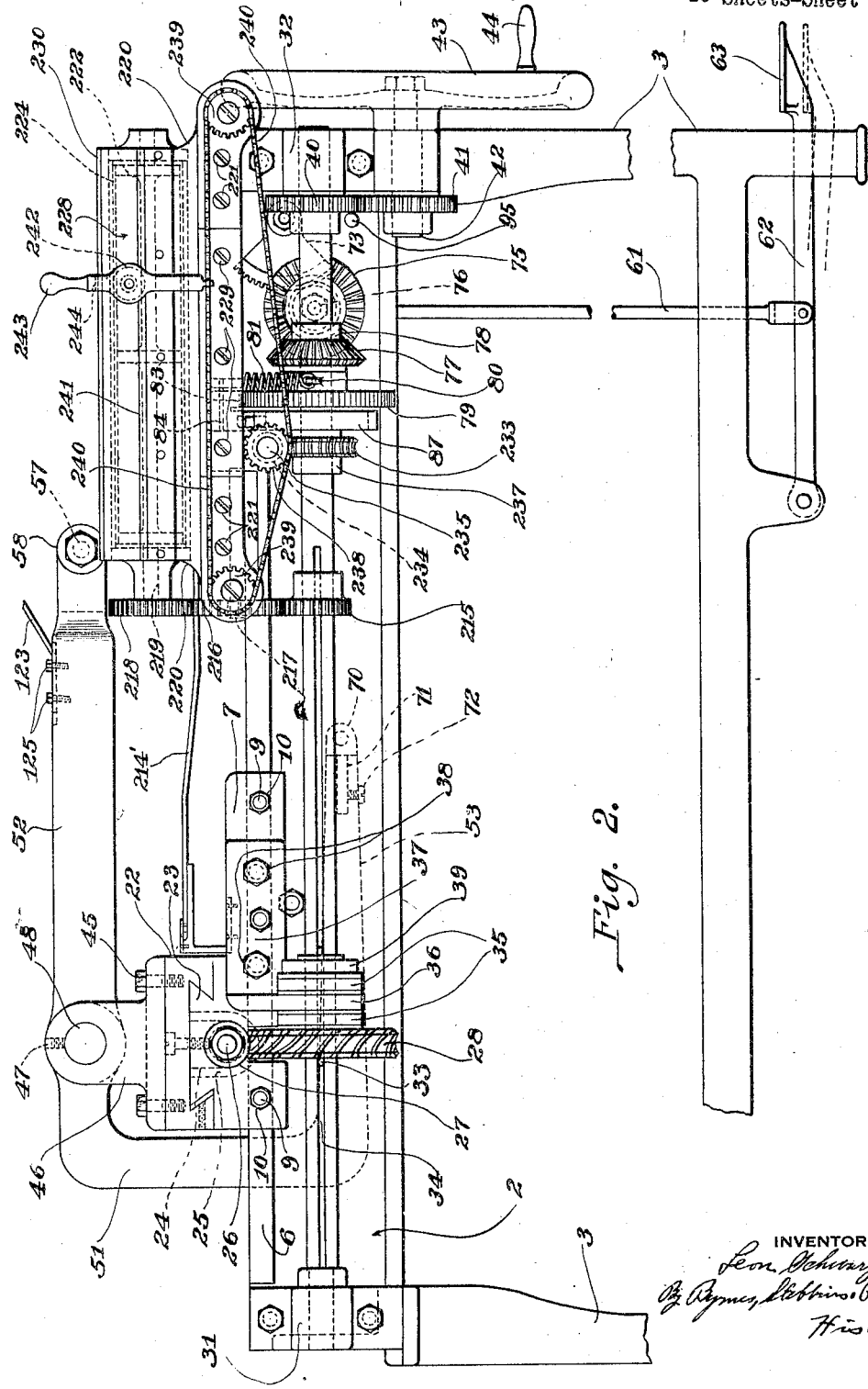
Figure 2 is a side elevation of the machine, looking from the left, the frame being partly broken away.
Figure 3:
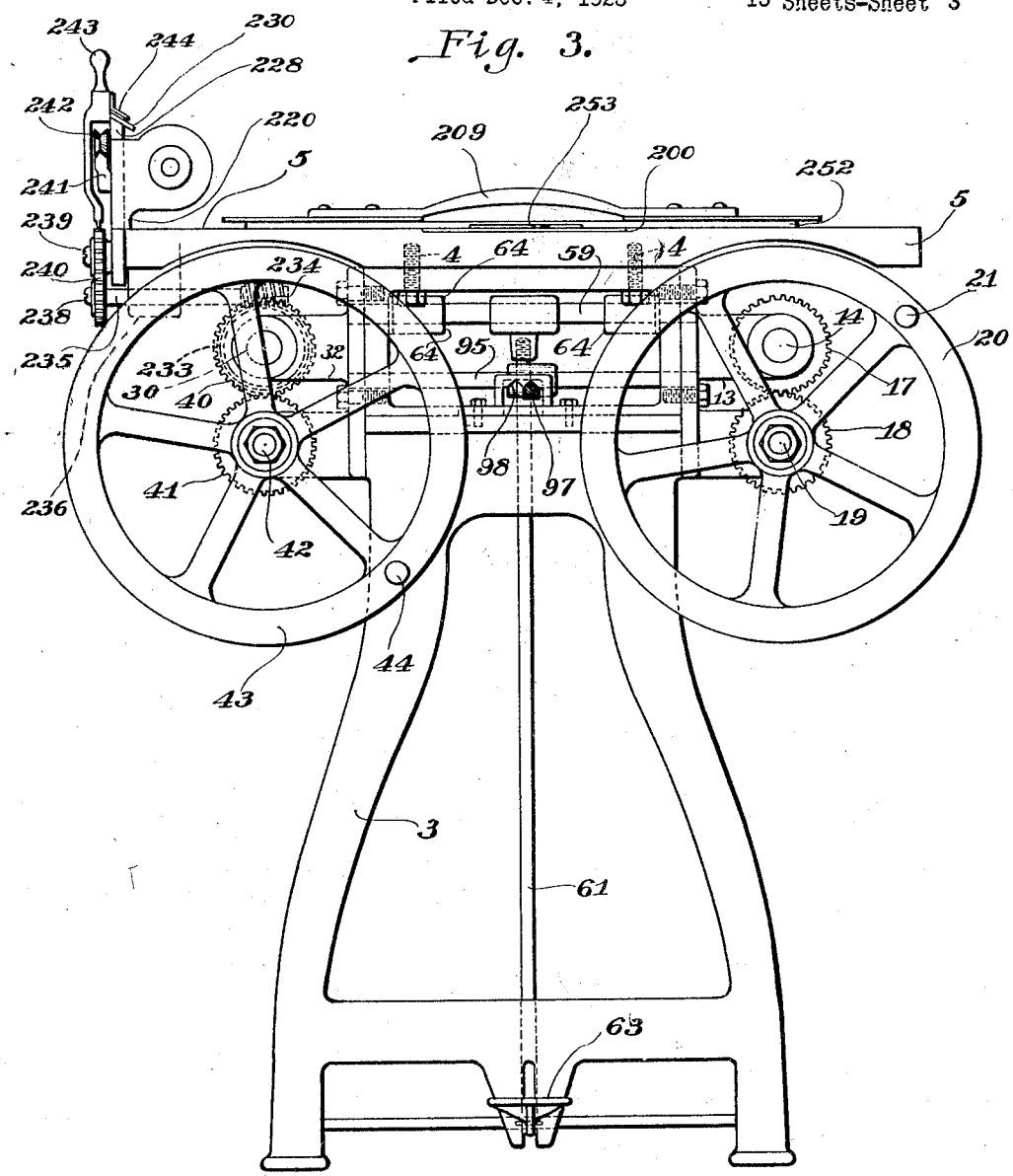
Figure 3 is a front elevation of the machine.

By reference to Figures 2 and 3, it will be seen that a vertical plate 228 is secured to the left hand edge of work plate 5 between the brackets 220 by means of screws 229. This plate has its upper edge beveled, and mounted thereon is an indicating plate 230 (Figures 3 and 36) having its lower edge in proximity to tube 224.

The indicating plate 230 has two longitudinally extending rows 231 and 232 of rectangular spaces marked off on its upper surface. There are as many of these spaces in each row as there are columns 227 and 227′ on tube 223, and they are arranged in correct alignment with such columns. At the extreme left of rows 231 and 232, and common to both, is another space 230′ having "0" marked therein. The first space of upper row 231 is marked "Scale". Several of the spaces in this row contain the letter H, the letters increasing in size from the left, and corresponding in size to the letters H marked on master wheel 146, the latter denoting the size of each set of characters that the master wheel controls. There may be more such letters H distributed in the spaces of the upper row than there are sets of characters on the type wheels, as other sizes of characters provided on any plain type wheel or available in connection with the multi-pallet wheel may be used. As previously pointed out, the letter H is employed for indicating the size of the characters in a set in preference to any other letter, because the shape of this letter particularly adapts it to give a clear visual indication of the size it represents. Of course, any other letter or a numeral might be employed for this purpose, if desired. Blank spaces in row 231 indicate that there are no sets of characters available of the size corresponding to the spacing movements of carriage 22 indicated by the numbers in row 232 opposite such blank spaces.

The spaces of the lower row 232 may preferably contain the numerals 1 to 24, inclusive, from left to right. As previously explained, automatic movement of the carriage 22 transversely of frame 2 is governed by the position of cam disk 87, the maximum movement assumed, by way of example, taking place when twenty-four teeth of ratchet wheel 79 are brought into operation. The numbers in the spaces of row 232 of the indicating plate 230 merely represent the number of such teeth which are brought into operation for any given setting of the cam disk 87.

Referring to Figures 1, 2 and 3, the cam disk 87 is provided with a hub on which is a worm gear 233 engaged by a worm 234 secured on a shaft 235 journaled in a bearing 236 depending from the under side of the work plate 5. The worm gear 233 and cam disk 87 are held against movement longitudinally of shaft 30 by means of a collar 237 and the ratchet wheel 79. Shaft 235 has a sprocket wheel 238 on its outer end. Two other sprocket wheels 239 are mounted upon the brackets 220. The sprockets 238 and 239 are engaged by a sprocket chain 240. Secured to the upright plate 228 (Figure 3) and to the brackets 220 is a longitudinal plate 241 (Figures 2 and 3). This plate has its upper edge double beveled, and riding upon said upper edge is a roller 242 having a V-shaped groove in its periphery to cooperate with said edge. The roller 242 is carried by an upright handle 243, the lower pointed end of which engages one of the links of sprocket chain 240. This handle has a pointer 244 cooperating with the indicating plate 230.

The construction and arrangement of the mechanism connecting the handle 243 with the cam disk 87 is such that when the pointer 244 is opposite the space at the left hand end of the indicating plate 230 containing "0", the high portion of the cam disk prevents the pawl 83 of ratchet wheel 79 from coming into engagement with any teeth of said ratchet wheel during the entire movement of lever arm 82 in a clockwise direction. In other words, whenever the pointer 244 is opposite said "0" mark, the automatic feeding mechanism for carriage 22 will be in the "out of gear" condition, or disconnected from the foot treadle 63. However, if the handle 243 is shifted one step to the rear so that the pointer 244 is brought opposite "Scale", the position of cam disk 87 relative to roller 86 of pawl 83 is such that the ratchet wheel 79 will be moved in a clockwise direction upon depression of the foot treadle 63 through an angular distance equivalent to one tooth of said ratchet wheel. When pointer 244 is opposite the space containing numeral 2, depression of the foot treadle will cause movement of the ratchet wheel a distance corresponding to two teeth of the ratchet wheel, and so on until pointer 244 is brought opposite the space containing numeral 24, in which position of the pointer the cam disk 87 is so positioned as to allow the maximum movement of the ratchet wheel upon depression of the foot treadle, or a distance corresponding to twenty-four teeth on said wheel. Suitable stops, not shown, may be provided to limit movement of handle 243 in both directions. The lines 225 on tube 224 cooperate with the pointer 244 to correctly position the latter exactly in the center of each space of the indicating plate 230.

The letters H of different sizes representing the sizes of sets of characters available must be accurately distributed in the spaces of row 231 with respect to the numerals in the spaces of row 232, as the letter H of a given size opposite a numeral below it signifies that if the pointer 244 is moved to a position opposite that letter and number, and the set of characters of that size used, the letters composing a word will have no spacing between them, as is often necessary due to the narrowness of the average backbone of a book cover. In other words, the different sizes of characters represented by the letters H in the spaces of row 231 of the indicating plate 230 opposite the numbers in row 232 indicating the various amounts of movement of the automatic feeding mechanism, means that each particular spacing of the carriage 22 and the space occupied by the impression of the corresponding size of characters are identical. However, spaces between characters are necessary in most cases for the good appearance of the work, the width of such spaces depending more particularly on the size of characters used, and also upon the total space available for the word or words desired to be impressed on the book cover. It is obvious that if, instead of using the size of characters that will give no spacing between the same for a given spacing movement of the carriage 22, as indicated, the next largest size of characters be used for the same carriage spacing, the impressions will inevitably be blurred by reason of one part of each succeeding character impressing on the top of the preceding one. On the other hand, if a set of characters next, third or fourth, for example, in size smaller than that indicated for that particular setting of the automatic feeding mechanism be used, a spacing between each character of the impressed word will be effected, and said spacing will be equal to the difference in size between the character indicated opposite the pointer 244 and the one used in its stead.

Referring to Figure 36, the pointer 244 is shown opposite the number 10, which means that at each step of the automatic feeding of the carriage 22, it will be advanced a distance equivalent to ten consecutive teeth of the ratchet wheel 79. If the set of characters be now used as represented by the letter H above the number 10 and opposite the pointer 244, there would be no spacing between the characters in the impressed word, but if the set of characters of the size represented by the letter H above the number 6, for instance, be employed, then the space between the characters will be directly proportional to the difference in size between the two sets of characters. The letters H on the indicating plate 230 indicate the size of the various sets of characters, and not their form, as the latter is left to the discretion of the operator. However, often characters of the same size but of different shape are used, and in order that each set of characters provided on the type wheel carrier be represented on the indicating plate 230, whereby the convenience afforded by its guidance in the correct selection of the proper set of characters in every case may be taken complete advantage of, several letters H conforming to the shape they represent may be marked in the same spaces of the indicating plate as are occupied by letters H representing size, as shown in Figure 36. However, where a letter H representing size and another letter H representing shape occupy the same space, they will both represent characters of the same size. If desired, an additional horizontal row of spaces may be provided on the indicating plate 230 also provided with letters H, but of proportionately smaller size, so that each would accurately indicate half size or three-quarter size, or the like, of those marked in the corresponding spaces of row 231, for example.

From the foregoing, it is thought that it will be perfectly clear how the controlling of the automatic feed of the carriage and selection of the proper set of characters is effected. After a selection has thus been made, the master wheel 146 is set accordingly to bring the selected set of characters into operative position, or a plain type wheel with the corresponding size of characters is mounted on the sleeve 102.

The ratio of the gears which connect the shaft 30 to the shaft 219 of the indicator device is preferably such that the inner tube 223 will make exactly two complete revolutions during the time that the carriage 22 is advanced through the maximum extent of its movement from left to right, or vice versa, across the slide 7 by the turning of the hand wheel 43. In other words, if it requires three complete revolutions of the shaft 30 to effect this maximum movement of the carriage 22, it is desirable that the said gear ratio should be such that one and one-half revolutions of said shaft 30 are required to effect one complete revolution of said inner tube 223. The advantage of this arrangement will be brought out hereinafter.

When the pointer 244 is moved to a position opposite "Scale" column 227', the automatic spacing movements of the carriage 22 upon depression of the foot treadle 63 will be equivalent to one tooth of the ratchet wheel 79, as previously explained. This smallest spacing movement of the carriage is only utilized for special purposes, such as for impressing a line or a double line by means of a marking character having a dash or a double-dash formed thereon. Ordinarily, the smallest characters employed would require a spacing movement of the carriage equivalent to at least two teeth of the ratchet wheel. The "Scale" column is graduated to indicate the length of a line of characters to be printed. The length of this column, as well as of the columns 227, is made equal to or a predetermined ratio of the maximum extent of travel of the carriage 22 across the slide 7. The arrangement is such that the "0" mark in "Scale" column 227' will be in alignment with the arrow heads 226 on the tube 224 when the character-marking head is positioned exactly in the middle of the work plate 5, that is, centered directly over the "0" marks of the graduations 201 of the plate 200, and the graduations of said "Scale" column 227' will progressively align themselves with said arrow heads, as the carriage 22 is moved to the left by the turning of the hand wheel 43. Since the tube 223 revolves twice on its axis while the carriage 22 moves through its maximum extent of travel across the slide 7, the "Scale" column will make one complete revolution while the character-marking head is advanced from the center of the work plate to the extreme left. For example, if the head be moved a distance of one-half inch from the center of the work plate 5 towards the left, the 1″ graduation mark of the "Scale" column will come into alignment with the arrow heads 226. If it is desired to print on a book cover a line of characters having a length of, say, one and three-eighths inches, then the head will be moved to the left from its center position with respect to the work plate 5, until the one and three-eighths inches mark of the "Scale" column comes into alignment with the arrow heads 226. This movement of the head to the left from the middle of the work plate will be exactly half of said one and three-eighths inches shown on the "Scale" column, due to the fact that the "Scale" column always indicates double in respect to the actual movement of the carriage that supports the head, and when the full line of characters of one and three-eighths inches in length has been printed, it will be located exactly in the middle of the backbone, and as a result thereof, will have the margins at the opposite ends of the line exactly alike.

It is common practice in jobbing book binderies to take patterns of gold or other foil markings on the backbones of the book covers of a certain class of books for future reference, in order that all books of a certain set, bound and lettered at different times, may be exactly alike in appearance. Said patterns are usually made by applying a paper on the backbone of the book cover and by rubbing a lead pencil on the surface of the paper on those parts where the letterings or other markings are located. The projections and indentations of the markings cause a fairly clear facsimile to come into view on the upper surface of the paper, thus giving correct information as to size of types used, line-spacings, lengths of the lines of characters, etc. In all such cases whenever a line of characters desired to be printed on the backbone of a book cover must have a predetermined length to match books or patterns of books previously done, for instance, the "Scale" column is resorted to. This is done, as already explained, by shifting the character-marking head in either direction over the left side of the work plate until the graduation mark on the "Scale" column 227' which indicates the length of line to be printed is in alignment with the arrow heads 226. The next thing to do after thus positioning the character-marking head over the book cover, is to shift the pointer 244 opposite that column 227 in which the number corresponding to the number of characters contained in the word or words of the line which it is desired to print is in line with the arrow heads 226, and after the pointer has been so shifted, the size of the set of characters to be used is determined, as will be hereinafter explained. It will be apparent that the indicating device enables the operator to locate, with mathematical precision, a line of a definite length to be printed exactly in the middle of the backbone of a book cover with equal margins at opposite ends of the line.

This method of using the indicator device is employed only in special cases, when the length of a line of characters is known in advance as herebefore stated. In most cases, however, when desiring to locate the character-marking head in the position where the first letter is to be printed, there is no practical means of ascertaining in advance the length that a line of characters is going to have, as this depends on the number of characters in a line, spacings between the characters and between the words, and the width of characters used. Unless especially needed, the length of a line of characters is entirely a negligible quantity and need not be considered at all in the average work. For the latter, different methods of using the indicator device, in which the "Scale" column 227' plays no part, may, therefore, be employed.

Each column 227 is divided into a number of equal spaces, and these spaces are numbered consecutively. By reference to Figure 37, it will be observed that the twenty-fourth column at the extreme right has nine equal divisions, and that each successive column to the left has divisions of gradually decreasing size, the second column having one hundred and eight such equal divisions.

The sizes of the graduations of the various columns as shown in Figure 37 were computed on the basis of the arbitrarily taken figures for the maximum extent of travel of the carriage 22, which is assumed to be 4.5" and for the maximum intermittent feeding movement of the same, when the pointer is opposite the number 24 on the indicating plate 230, which is assumed to be .5". If the maximum travel of the carriage is 4.5" and its intermittent movement is .5", when the pointer 244 is opposite the number 24, then the foot treadle 63 must be depressed nine times to effect said maximum movement of the carriage. It has been assumed that it requires three revolutions of shaft 30 to effect maximum movement of the carriage 22, and it has also been assumed that the ratchet wheel 79 has seventy-two teeth on its periphery. Therefore, in making three complete revolutions, the periphery of the ratchet wheel travels through a distance equivalent to two hundred and sixteen teeth. When the pointer 244 is opposite the number 24 on the indicating plate 30, one depression of the foot treadle causes the ratchet wheel to turn through a distance equivalent to twenty-four of its teeth, and nine such depressions of the foot treadle cause said ratchet wheel to turn through a distance equivalent to said two hundred and sixteen teeth. When the pointer 244 is shifted to the next column to the left, one depression of the foot treadle causes the ratchet wheel to be turned through a distance equivalent to twenty-three of its teeth. Under these conditions, the foot treadle can be depressed as many times as 23 is contained in 216, which will be nine and a fraction times, the fraction being ignored. Each intermittent movement of the carriage will be one-twenty-fourth shorter than when the pointer 244 was opposite the twenty-fourth column. If the pointer 244 be now shifted a few steps further to the left, or to the fifteenth column, for example, the foot treadle may be depressed fourteen times. The length of the spaces in a column indicates exactly, or to a predetermined ratio, the extent of each intermittent movement of the carriage 22 when the pointer 244 is opposite that particular column, and the highest number appearing in that column indicates the number of spacing movements of the carriage which are possible when the pointer is in that position.

As the divisions of the several columns are of gradually and systematically decreasing size from right to left (Figure 37), and as all divisions of the same column, except the fractional division, are equal, no number in the various columns, for example 16, is seen in alignment with the arrow heads 226 more than once at any particular setting of the indicating device. This important feature of the indicator is used for correct positioning of the character-marking mechanism over the work, and for visual indication to the operator of the exact position to which the pointer 244 should be shifted to impress a given number of characters of a certain size in a limited space and in the middle of the backbone of the book cover without guesswork, calculations or trials.

The present invention contemplates the provision of a specially prepared slip as an adjunct of the apparatus giving the operator all of the required data for a particular job in a uniform, clear and systematic manner, so that he may see at a glance, for example, how many letters there are in a word or words to be printed.

Referring to Figure 25, a spring-pressed clip 245 is provided on the left hand clamping plate 208 for holding a slip 243 of the character above referred to. This slip has its middle portion divided into squares 247 by vertical and horizontal lines. The upper row of squares has numerals 248. The remaining lower rows are adapted to be filled in with the title, sub-title, author's name, etc., in line with the indicative words 249 printed upon the left hand margin of the slip. Thus, by glancing at row 248, the operator will be informed as to the number of letters in a word or words, including the spaces between words forming a line. The space between words it is obvious should be considered exactly as if it were a letter, because the automatic feeding of the carriage 22 will be the same for a space as for a letter. On the upper portion of the slip may be printed the name or trade-name of the concern that owns the bookbindery which supplies the slips to its clients, and the lower portion of the slip may be provided with the required number of little squares 250 in front of which indicating words 251 may be printed.

As before stated, there are several methods by means of which the indicator device may be used. For each method one known factor is required, such as the length of a line of characters, or the margins between opposite ends of a line of characters and the side edges of the backbone, or else the width of the types to be used. But once the first factor for each method is determined, the remaining necessary factors to make a good printing job,—which are the correct setting of the automatic spacing mechanism, the selection of the size of types, the proper spacing between the letters, the setting of a line of characters in the middle of the backbone so that the margins at each end of the line may be exactly alike, and the length of a line of characters that is going to be printed,—will be given by the indicator.

The setting of the indicating device depends upon several factors, such as the width of the backbone and the margin desired at each end of a line. There are also several factors to be considered in determining what this margin should be, as, for example, the number of words composing a line, the size of the type to be used, the thickness of the book to which the cover is to be attached, and the character of the words. In the words "Dictionary of the English language", for instance, the first word being of primary importance, should be printed with conspicuous or large size type requiring the greater portion of the limited width of the backbone. Nevertheless, the margins should be substantial, otherwise the appearance of the word would not be the best. The words "of the", being of secondary importance, may be printed with smaller characters with relatively wide margins. However, once the extent of the margin is decided upon, the setting of the indicator device, as previously explained, will insure that the margins at opposite ends of the line of characters will be the same, and as a result thereof, the line will appear exactly in the middle of the backbone of the book cover.

As in most cases the length of a line of characters to be printed is an unknown quantity, as before stated, the character-marking head may correctly be set in the position where the first letter of a line is to be impressed by simply shifting said head to the left, by means of the hand wheel 43, until the desired margin is provided between the point where said first letter is to be printed and the left side edge of the backbone. This setting for the margin is the first factor required to be determined when this method of using the indicator device is employed, in order that the indicator supply the remaining required information. The width of the backbone of the book cover is one factor, and the desired margin at each end of a line of characters is another factor that mutually determine the operative position of the indicating device. It is obvious that with a backbone of two inches in width, for example, if the head is so positioned for the first letter of a line as to provide a margin of one-half inch at each end of the latter, said head must have been shifted from the middle of the work plate a distance of one-half inch, and after the full line of characters has been printed, it will have a length of one inch and will be located exactly in the center of the backbone. But if the backbone has a width of three inches instead of two inches, and the same one-half inch margins are to be provided, said head would be shifted a distance of one inch from the middle of the work plate. Accordingly, if the margin be varied to a greater or lesser degree for the same width of backbone, this, similarly, will affect the distance that the head will have to travel to the left from the middle of the work plate. Due to the positive interconnection between the carriage 22 that supports the head and the tube 223 having graduations of the indicator device, different positions to the left of said head from the middle of the work plate will cause different settings of said graduations in regard to the stationary arrow heads 226. It will thus be apparent how the width of a backbone and the setting of the head for the desired margins at opposite ends of a line of characters of unknown length, mutually set the indicator device in operative position, when the margin method is employed.

The number of characters in the word or words and the spacing between the latter are factors that determine the position of the pointer 244. After the character-marking head, and hence the indicator device, has been thus set, the column 227 in which the number corresponding to the number of characters in a word or words composing the line to be printed is in line with the arrow heads 226, is the one to which the pointer 244 must be shifted. This is so because when the character-marking head is shifted from the center of the work plate 5 to the left until the arrow heads 226 measure off on "Scale" column 227′, the length of the line to be printed, these arrow heads also measure off an equal distance on each of the columns 227, and, therefore, that column 227 having its measured off portion divided into a number of spaces equal to the number of characters in the line to be printed is the column to which the pointer 244 must be shifted, in order to give the required number of carriage spacing movements. In determining the total number of characters in a line, in order to properly position the pointer 244, a space between two words of the line must be counted as a character, and, if there is to be a double space between two words, this must be counted the same as two characters. The actual counting operation of the characters and spacings between the latter contained in a line is entirely eliminated, also unavoidable errors in said counting operation, by the use of the specially prepared slip 246, previously described.

The number of characters in a line, the desired spacing between the latter, and the length of the space on the backbone available for the line which is determined by the positioning of the head for the first letter to be impressed, are factors that determine the size or rather the width of type to be used. After the character-marking head has been thus positioned, and the pointer 244 has been moved to the column 227 in which the number indicating the number of characters in the line to be printed is opposite the arrow heads 226, if that size of type is used which is represented by the letter H in the space of row 231 of indicating plate 230 directly under the pointer 244, there will be no spacing between the characters. However, if any other kind of type to the left is selected, then the space between characters printed will be equivalent to the difference in width between the kind of character selected and the one under said pointer. Furthermore, if said space under the pointer is blank, this will indicate that no set of characters of a size equivalent to the spacing movement of carriage 22 provided by this particular setting of the indicator device is available. In that case, a set of characters of a size indicated by a letter H in a space to the left of the blank space must necessarily be used. From the foregoing, it will be seen that the proper selection of the size and form of type, either to give no spacing or any desired spacing, is a simple matter.

From the above, two methods of using the indicator device will be apparent. The first method being by means of the "Scale" column 227′ when the length of a line to be printed is known in advance, and the second one, when the length of the line is not known being by means of the margin method. There is, however, still another convenient method of operation which may be employed. This method consists in first selecting on the indicating plate 230 the size of the set of characters which it is desired to use. The next step is to ascertain the number of characters in the line to be printed by referring to the slip 246. This number is then observed in the column 227 opposite the selected letter H on the indicating plate 230, while the hand wheel 43 is turned. Rotation of the hand wheel is arrested as soon as the observed number comes into alignment with the arrow heads 226 on the tube 224. If spacing between characters is desired, the operator will observe the figure representing the number of characters to be printed in an appropriate column 227 to the right of the column which is opposite the H on the indicating plate indicating the selected size of characters. The pointer 244 will now be shifted to this column, and the master wheel set to bring into operative position the size of characters selected. Then the handle 111 will be operated to bring the first character to be printed into operative position, and the printing operation commenced by depressing the foot treadle.

The operation of the machine may be briefly summarized as follows: Let it be assumed that it is desired to print the contents of the slip 246 shown in Figure 35. The first step is to place a book cover 252 (Figure 3) over the work plate 5 and center and clamp it in position thereon. This is done by grasping the handle 209 and raising it so that the book cover in a flat or open condition may be slipped under the clamping plates 208 until the upper edge of the book cover has reached the stops 202. With the handle still raised, the book cover is centered on the work plate by means of the graduations 201 provided on the plate 200. Then a suitable cardboard filler 253 is inserted between the relatively thin portion of the backbone and the graduated plate 200, so that the backbone's upper surface is supported flush with or a trifle higher than the upper surface of the book cover's front and back portions. The handle 209 is then lowered in order that the clamping plates 208 may firmly clamp the book cover in position.

Referring to the slip, it is seen that the first word comprising a line is composed of nine characters, and that said word is the author's name. This word must, therefore, be printed with the largest size of type possible considering the thickness of the book to which the cover is to be attached. For this reason, the margin at each end of the word "Webster's" cannot be very great. The next step is to bring the character-marking head to the point over the backbone of the book cover where the first letter is to be impressed. To do this, the pointer 244 must first be shifted to the extreme left of its travel, as viewed in Figure 36, so as to position it over the "0" mark of the indicating plate 230. In this position of the pointer, the automatic feed mechanism is in the "out of gear" condition, and movement of the carriage 22 may be effected by turning the hand wheel 43. The latter is then rotated in the proper direction until the head is positioned over the said point where the first letter is to be printed. This position of the head is determined by providing the desired margin at the beginning of the line, which may be any appropriate margin. The next step is to shift the pointer 244 to that column 227 in which the number indicating the number of characters in the word to be printed is in alignment with the arrow heads 226.

The next step is to select the proper size and shape of characters to be employed. If the book to which the cover is to be attached is quite thick, a spacing between characters equal to about one-third the width of a character may be appropriate. In that case, the operator will select that set of characters represented by an H on the indicating plate 230 which is approximately one-third narrower than the letter H under the pointer. The same space of the indicating plate 230 in which the selected size of character is located may contain another H indicating that there is a set of characters of that size of a particular form. In that case, the operator may select that particular form of character if he so desires.

Having selected the size of characters to be used, the operator will now bring into operative position on the type wheel carrier the selected set. This is done by pulling out the knob 160 and shifting the lever 156 to the "off" position, thereby unlocking all of the type wheels 129 and the master wheel 146. A suitable tool may then be inserted in one of the orifices 149 of the master wheel and the latter turned until the indicative mark, represented also by an H on the periphery of the master wheel corresponding to the H selected on the indicating plate 230, is in alignment with the arrows 167 on the indicating plate 164. Thereafter, the lever 156 will be shifted to the "on" position to lock the master wheel and type wheels against rotation.

The next operation in order is to bring into printing position the letter "W" of the set of marking characters just brought into operative position. This is done by pressing inwardly upon the handle 111 to thereby disengage the toothed wheel 118 from the fixed tooth 120, and then turn it in the proper direction until the letter "W" on the indicating plate 164 is in alignment with the pointer 169.

The apparatus is now set for printing the first letter of the word "Webster's". This is accomplished by depressing the foot treadle 63, thereby lowering the character-marking head so as to bring the marking character "W" into contact with the book cover, the downward movement of the foot treadle being limited by reason of the engagement of the arm 88 with the adjustable stop 92 (Figure 6). Upon release of the foot treadle, the spring 81 will raise the head and will effect a predetermined amount of spacing movement of the carriage 22. The letter "E" is then brought into printing position by means of the handle 111, and the foot treadle again depressed. The operation is thus continued until all of the letters of the word "Webster's" have been printed on the book cover. For the apostrophe mark the operation will be the same as for any of the other characters.

Before starting with the next line, or "dictionary" impressions, the head is advanced forward a desired distance, which may be controlled by the graduations 214 on the clamping plates 208 cooperating with the pointer 214' carried by the slide 7. To effect this line spacing, the hand wheel 20 is turned in the proper direction to advance the slide 7. Since the word "dictionary" should also be prominent, the same size of characters might be used as for the word "Webster's", so that the master wheel may be left in the same position. The pointer 244 will now be brought to position opposite the "0" mark of indicating plate 230, and the hand wheel operated to position the character-marking head over the point of the book cover where the letter "D" is to be printed. Inasmuch as the slip 246 indicates that the word "dictionary" contains ten characters, the operator may correctly position the head by fixing his eyes upon the same column 227 where the "9" of the word "Webster's" was located, and arresting the rotation of the hand wheel 43 as soon as the figure 10 of that column is in alignment with the arrow heads 226. The pointer 244 will then be shifted to that column, and the handle 111 operated to bring the letter "D" into printing position. Then the foot treadle will be depressed to print the letter "D" upon the book cover, and the operation repeated for the remaining letters of the word "dictionary".

Another appropriate line spacing will then be effected for the printing of the words "of the". These words, being of secondary importance, may be printed with a smaller size of type than the previous words. Since there are only six spacings for the carriage in these words, the margins at the ends of the line will be greater than for the words "Webster's" and "dictionary". The printing of these words involves a spacing movement of the carriage 22 without effecting an impression upon the book cover, in order to provide a space between the words "of" and "the". In order to accomplish this step, the handle 96 (Figure 1) is operated to shift the stop lever 94 to the left, so that upon depression of the foot treadle, the arm 88 will engage said stop lever, thereby preventing the lowering of the head to a sufficient extent to effect an impression upon the book cover. Upon the raising of the character-marking head, however, by the spring 81 when pressure is removed from the foot treadle, automatic spacing of the carriage 22 will take place. When the word spacing is performed, the pointer 244 may be shifted to a different position in order to cause a greater or less spacing movement of the carriage, or the foot treadle may be depressed a plurality of times to increase the spacing.

The advantages arising from the present invention will be apparent to those skilled in the art, in view of the above detailed description of the construction and operation of the illustrated embodiment of the invention. An important feature of the invention resides in the provision of a plurality of sets of printing characters, any one of which may be readily brought into operative position, and which obviates the necessity of providing a great number of loose characters and composing the word or words to be printed, and then redistributing these characters after each job. Another important feature of the invention resides in the provision of automatic spacing mechanism, variable at will, whereby the character-marking head may be positively moved a predetermined amount after each impression. Still another important feature of the invention resides in the provision of electric heating means for giving the required temperature to the marking characters. A further important feature of the invention resides in the provision of an indicator device whereby the operator is enabled to readily determine the size of characters to be employed and the proper spacing of the same in order to give the desired effect, and whereby he is further enabled to accurately center each line with respect to the book cover, in order to have the desired margins at the ends of the line. Still another feature of the invention resides in the provision of means whereby the characters in a line may be printed or impressed in perfect alignment, and the several lines of characters printed in perfect parallelism. Still another feature of the invention resides in the provision of a character-marking head adapted to interchangeably support either a type wheel carrier, a plain type wheel, or a multi-pallet wheel, as required. A further feature of the invention resides in the provision of a specially prepared work slip for use in conjunction with the indicator device. A still further feature of the invention resides in the provision of means for clamping a book cover in position on the work plate.

I claim:

1. In a printing machine, a work support, a type carrier movable transversely of said support, a plurality of types carried by said carrier and adapted to be selectively brought into operative position, a foot treadle, means operatively connecting said foot treadle with said carrier whereby the latter is depressed when said foot treadle is actuated, spring-actuated means adapted to raise said carrier when said foot treadle is released, means operated by said spring-actuated means whereby a spacing movement transversely of said support is imparted to said carrier simultaneously with the raising of the latter, and means for limiting the raising and lowering movements of said carrier, substantially as described.

2. In a printing machine, a work support, a type carrier movable transversely of said support, a plurality of types carried by said carrier and adapted to be selectively brought into operative position, treadle operated means for lowering said carrier, automatic means for raising said carrier, and means operated by said automatic means for imparting a spacing movement to said carrier transversely of said support, said means including a ratchet, a pawl adapted to cooperate with said ratchet, and means adjustable to vary the extent of movement of said ratchet by said pawl upon upward movement of said carrier, substantially as described.

3. In a printing machine, a rotatable type wheel carrier, a plurality of type wheels mounted peripherally of said carrier whose axes are at an angle to the axis of the carrier, a plurality of sets of types carried by said wheels, and means operatively connecting said wheels together whereby to enable them to be simultaneously rotated to bring any desired set of types thereon into operative position, said means including a master wheel having means for indicating the character of the types in each of said sets, substantially as described.

4. In a printing machine, a rotatable type wheel carrier, a plurality of type wheels mounted peripherally of said carrier and each rotatable about an axis at right angles to the axis of rotation of said carrier, a plurality of sets of types carried by said wheels, and means operatively connecting said wheels whereby said wheels may be simultaneously rotated to bring any desired set of types into operative position, substantially as described.

5. In a printing machine, a rotatable type wheel carrier, a plurality of type wheels mounted peripherally of said carrier and each rotatable about an axis at right angles to the axis of rotation of said carrier, a plurality of sets of types carried by said wheels, means operatively connecting said wheels whereby said wheels may be simultaneously rotated to bring any desired set of types into operative position, and means for locking said wheels in such position, substantially as described.

6. In a printing machine, a rotatable type wheel carrier, a plurality of type wheels mounted peripherally of said carrier and each rotatable about an axis at right angles to the axis of rotation of said carrier, a plurality of sets of types carried by said wheels, means operatively connecting said wheels whereby said wheels may be simultaneously rotated to bring any desired set of types into operative position, and means engageable with each of said wheels for positively locking said wheels in such position, substantially as described.

7. In a printing machine, a rotatable type wheel carrier, a plurality of type wheels mounted peripherally of said carrier and each rotatable about an axis at right angles to the axis of rotation of said carrier, a plurality of sets of types carried by said wheels, and means operatively connecting said wheels whereby said wheels may be simultaneously rotated to bring any desired set of types into operative position, said means including a master wheel having means for indicating the character of the types in each of said sets, substantially as described.

8. In a printing machine, a rotatable type wheel carrier, a plurality of type wheels mounted peripherally of said carrier and each rotatable about an axis at right angles to the axis of rotation of said carrier, a plurality of sets of types carried by said wheels, and a flexible shaft operatively connecting said wheels whereby said wheels may be simultaneously rotated to bring any desired set of types into operative position, substantially as described.

9. In a printing machine, a rotatable type wheel carrier, a plurality of type wheels mounted peripherally of said carrier, a plurality of sets of types carried by said wheels, means operatively connecting said wheels together whereby to enable them to be simultaneously rotated to bring any desired set of types into operative position, means for rotating said carrier to bring any desired type of such set into operative position, a protective casing for said type wheels, and heating means within said casing, substantially as described.

10. In a printing machine, a work support having means to enable centering a book cover or the like thereon transversely thereof, a type carrier movable transversely of said support and carrying a plurality of types adapted to be selectively brought into operative position, means for producing relative movement of said support and carrier towards and from each other, indicating means, and means for simultaneously moving said type carrier transversely of said support and actuating said indicating means, said indicating means being adapted to indicate the proper position of said carrier for printing the first character of a line of predetermined length in order that such line may have equal margins at the ends thereof, substantially as described.

11. In a printing machine, a work support, a type carrier movable in either direction transversely of said support and carrying a plurality of types adapted to be selectively brought into operative position, means for producing relative movement of said support and carrier towards and from each other, indicating means, and means for simultaneously moving said type carrier transversely of said support and actuating said indicating means, said indicating means being adapted to indicate the central position of said carrier transversely of said support and to also indicate a distance equal to twice the extent of any movement of said carrier in one direction away from said central position thereof, substantially as described.

12. In a printing machine, a work support, a type carrier having a plurality of sets of types of different sizes, the types of different sets being adapted to be selectively brought into operative position, means for depressing and elevating said carrier, means effective upon elevation of said carrier for imparting a spacing movement to the same transversely of said support, control means for said last mentioned means for varying the extent of such spacing movement, and means for indicating the adjustment of said control means whereby the spacing for different sets of type may be noted before printing, substantially as described.

13. In a printing machine, a work support, a type carrier carrying a plurality of sets of types adapted to be selectively brought into operative position and the individual types of each set being adapted also to be selectively brought into operative position, said sets differing from each other in the size of the type which they contain, means for elevating and depressing said carrier, means effective upon elevation of said carrier for imparting a spacing movement to the same transversely of said support, control means for said last mentioned means for varying the extent of such spacing movement, and means for indicating the adjustment of said control means whereby the spacing for different sets of type may be noted before printing, substantially as described.

14. In a printing machine, a work support, a type carrier carrying a plurality of sets of types adapted to be selectively brought into operative position and the individual types of each set being adapted also to be selectively brought into operative position, said sets differing from each other in the size of the type which they contain, means for elevating and depressing said carrier, means effective upon elevation of said carrier for imparting a spacing movement to the same transversely of said support, means for adjusting said last mentioned means for varying the extent of such spacing movement, and means for indicating the adjustment of said adjusting means in order that the corresponding spacing movements of said carrier shall each be of an extent equal to the size of characters in a corresponding set and also for indicating other adjustments of said adjusting means for producing spacing movements of said carrier either of lesser or greater extent than the sizes of characters in the several sets, substantially as described.

15. In a printing machine, a work support, a type carrier having a plurality of types adapted to be selectively brought into operative position, manually operated means for moving said carrier in either direction transversely of said support, means for depressing and elevating said carrier, automatic means effective upon elevation of said carrier for imparting a spacing movement to the same transversely of said support, means for adjusting said automatic means for varying the extent of such spacing movement, and indicating means actuated simultaneously with said manually operated means for indicating the position of said carrier for the printing of the first character of a line of characters of predetermined length in order that such line may have equal margins at the ends thereof when the work is properly centered on said work support and for simultaneously indicating the adjustment of said adjusting means in order that a predetermined number of equal spacing movements of said carrier shall effect a total movement of said carrier transversely of said support equal to said predetermined length of line of characters, substantially as described.

16. In a printing machine, a work support, a type carrier having a plurality of sets of types differing in size adapted to be selectively brought into operative position and the individual types of each set being adapted also to be selectively brought into operative position, manually operated means for moving said carrier in either direction transversely of said support, means for depressing and elevating said carrier, automatic means effective upon elevation of said carrier for imparting a spacing movement to the same transversely of said support, means for adjusting said automatic means for varying the extent of such spacing movement, indicating means actuated simultaneously with said manually operated means for indicating the position of said carrier for the printing of the first character of a line of characters of predetermined length in order that such line may have equal margins at the ends thereof when the work is properly centered on said work support and for simultaneously indicating the adjustment of said adjusting means in order that a predetermined number of equal spacing movements of said carrier shall effect a total movement of said carrier equal to said predetermined length of line of characters, and additional indicating means cooperating with said first mentioned indicating means for indicating the set of characters to be used in order that the width of each character employed may be equal to the extent of the spacing movement employed, substantially as described.

17. In a printing machine, a work support, a type carrier having a plurality of sets of types differing in size adapted to be selectively brought into operative position and the individual types of each set being adapted also to be selectively brought into operative position, manually operated means for moving said carrier in either direction transversely of said support, means for depressing and elevating said carrier, automatic means effective upon elevation of said carrier for imparting a spacing movement to the same transversely of said support, means for adjusting said automatic means for varying the extent of such spacing movement, indicating means actuated simultaneously with said manually operated means for indicating the position of said carrier for the printing of the first character of a line of characters of predetermined length in order that such line may have equal margins at the ends thereof when the work is properly centered on said work support and for simultaneously indicating the adjustment of said adjusting means in order that a predetermined number of equal spacing movements of said carrier shall effect a total movement of said carrier equal to said predetermined length of line of characters, and additional indicating means cooperating with said first mentioned indicating means for indicating the set of characters to be used in order that the width of each character employed may bear the desired proportion to the extent of the spacing movement employed, substantially as described.

18. In a printing machine, a work support, a type carrier having a plurality of types adapted to be selectively brought into operative position, manually operated means for moving said carrier in either direction transversely of said support, means for intermittently operating said carrier for bringing the selected types into engagement with the work, means operatively connected with said manually operated means and effective upon each intermittent operation of said carrier for imparting a spacing movement to the same transversely of said support, means for adjusting said last mentioned means for varying the extent of such spacing movement, and indicating means cooperating with said adjusting means for indicating the adjustment of the latter in order that a predetermined number of spacing movements of said carrier shall effect a predetermined total movement of said carrier transversely of said support, a portion of said indicating means being movable by said manually operated means simultaneously with the movement of said type carrier thereby transversely of said support for indicating the proper position of said carrier for printing the first character of a line of predetermined length in order that such line may have equal margins at the ends thereof, substantially as described.

19. In a printing machine a rotatable type wheel carrier, a plurality of type wheels mounted peripherally of said carrier, means for simultaneously shifting each wheel, and means rotatable about the axis of the carrier for engaging and locking each wheel in a predetermined position, substantially as described.

20. In a printing machine, a rotatable type wheel carrier, a plurality of type wheels mounted peripherally of said carrier on axes at right angles to the axis of the carrier, means operatively connecting said wheels together to enable them to be simultaneously rotated to bring any desired sets of types thereon into operative position, and locking means rotatable about the axis of the type wheel carrier for engaging and locking each wheel in its adjusted position, substantially as described.

21. In a printing machine, a rotatable type wheel carrier, a plurality of type wheels mounted on said carrier whose axes are perpendicular to the axis of the carrier, and a rotatable locking device arranged to rotate about an axis of the carrier for locking each of the type wheels in its adjusted position, substantially as described.

22. In a printing machine, a rotatable type wheel carrier, a plurality of type wheels mounted on said carrier, a plurality of sets of types carried by said wheel, there being an opening in each wheel for each type carried thereby, and a rotatable locking device mounted on the type wheel carrier having prongs arranged to enter the openings in the type wheels to lock them in their adjusted position, substantially as described.

23. In a printing machine, a rotatable type wheel carrier, type carried by said wheel, a support for the wheel carrier, a heater in said support, and a shield surrounding the carrier, a portion of said shield being fixedly carried by the support while the remainder is carried by the wheel, the fixed portion of the shield having an opening therein for permitting the selected type to be brought into engagement with the surface to be printed, substantially as described.

24. In a printing machine, a work support for receiving a book cover or the like, a type carrier mounted on a carriage having a plurality of sets of types of different sizes, the types of different sets being adapted to be selectively brought into operative position, a slide for supporting the carriage, means for adjusting the slide longitudinally, means for moving the type relative to the work on the support, means associated with the last mentioned means for shifting the carriage laterally, and graduated control means under the control of the operator for predetermining the lateral movement of the carriage for each printing operation whereby the spacing for the different sets of types may be noted before printing, substantially as described.

25. In a printing machine, a work support for a book cover or the like, a slide arranged to be moved longitudinally relative to the support, a carriage mounted on the slide and arranged to be moved laterally thereon relative to the support, sets of types of different sizes carried by the carriage, hand operated means for moving the slide, manually operated means for moving the type for printing on the work on the support, carriage shifting means operatively connected with the manually operated means for shifting the carriage for each impression, and combined indicating and control means directly under the control of the operator for varying the movement given to the carriage for noting and varying the spacing for the different sets of types before printing, substantially as described.

26. In a printing machine, a work support for a book cover or the like, a slide arranged to be moved longitudinally relative to the support, a carriage mounted on the slide and arranged to be moved laterally thereon relative to the support, type carried by the carriage, hand operated means for moving the slide, manually operated means for moving the type for printing on the work on the support, carriage shifting means operatively connected with the manually operated means for shifting the carriage for each impression, said shifting means including pawl and ratchet mechanism having a fixed throw for each movement of the manually operated means, and control means directly under the control of the operator for varying the movement given to the carriage from zero to the full throw of the pawl and ratchet means, substantially as described.

27. In a printing machine, a work support for a book cover or the like, a slide arranged to be moved longitudinally relative to the support, a carriage mounted on the slide and arranged to be moved laterally thereon relative to the support, type carried by the carriage, hand operated means for moving the slide, manually operated means for moving the type for printing on the work on the support, carriage shifting means operatively connected to the manually operated means for shifting the carriage for each impression, said shifting means including pawl and ratchet mechanism having a fixed throw for each movement of the manually operated means, control means directly under the control of the operator for varying the movement given to the carriage from zero to the full throw of the pawl and ratchet means, and manually operated means for shifting the carriage laterally when the control means is shifted to zero.

In testimony whereof I have hereunto set my hand.

LEON SCHWARZMANN.